United States Patent
Masters

(10) Patent No.: US 7,606,912 B1
(45) Date of Patent: Oct. 20, 2009

(54) SYSTEM AND METHOD FOR PERFORMING APPLICATION LEVEL PERSISTENCE

(75) Inventor: Richard Roderick Masters, Seattle, WA (US)

(73) Assignee: F5 Networks, Inc., Seattle, WA (US)

(*) Notice: Subject to any disclaimer, the term of this patent is extended or adjusted under 35 U.S.C. 154(b) by 0 days.

(21) Appl. No.: 11/684,565

(22) Filed: Mar. 9, 2007

Related U.S. Application Data

(60) Division of application No. 11/260,651, filed on Oct. 26, 2005, now Pat. No. 7,346,695, which is a continuation of application No. 11/235,643, filed on Sep. 26, 2005, now Pat. No. 7,287,084, and a division of application No. 10/284,035, filed on Oct. 28, 2002, now Pat. No. 6,970,933, application No. 11/684,565, which is a continuation of application No. 11/235,643, which is a continuation of application No. 10/284,035, which is a continuation of application No. 10/006,555, filed on Dec. 4, 2001, now Pat. No. 6,473,802, which is a continuation of application No. 09/353,335, filed on Jul. 15, 1999, now Pat. No. 6,374,300.

(51) Int. Cl.
G06F 13/00 (2006.01)
(52) U.S. Cl. .................. 709/227; 709/219; 709/229
(58) Field of Classification Search ............. 709/217, 709/219, 223, 225, 226, 227, 238
See application file for complete search history.

(56) References Cited

U.S. PATENT DOCUMENTS 3,950,735 A 4/1976 Patel
4,644,532 A 2/1987 George et al.
4,965,772 A 10/1990 Daniel et al.
5,023,826 A 6/1991 Patel (Continued)

FOREIGN PATENT DOCUMENTS

EP 0 744 850 11/1996

(Continued)

OTHER PUBLICATIONS

Office Communication for U.S. Appl. No. 11/874,109 dated Mar. 9, 2009.*

(Continued)

*Primary Examiner*—Viet Vu
(74) *Attorney, Agent, or Firm*—Darby & Darby PC; John W. Branch

(57) ABSTRACT

A method and apparatus for inserting and examining Cookies in the data streams of HTTP connections for the purpose of persistently directing HTTP connections to the same destination. A network device directs subsequent HTTP connections from the same client to the same server (destination) for accessing the requested resources. There are four modes for employing the Cookie to persistently direct HTTP connections. The associated mode inserts a Cookie that uniquely identifies the client into an HTTP response. The passive mode inserts Cookie information that uniquely identifies a previously selected destination into an HTTP response. In the rewrite mode, a network device manages the destination information that is rewritten over blank Cookie information generated by the destination producing the HTTP response. The insert mode inserts and removes Cookie information in the data packets for HTTP requests and response prior to processing by the destination.

14 Claims, 15 Drawing Sheets

U.S. PATENT DOCUMENTS

| | | | |
|---|---|---|---|
| 5,053,953 A | 10/1991 | Patel | |
| 5,166,931 A | 11/1992 | Riddle | |
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Dally | |
| 5,517,617 A | 5/1996 | Sathaye et al. | |
| 5,519,694 A | 5/1996 | Brewer et al. | |
| 5,519,778 A | 5/1996 | Leighton et al. | |
| 5,521,591 A | 5/1996 | Arora et al. | |
| 5,528,701 A | 6/1996 | Aref | |
| 5,581,764 A | 12/1996 | Fitzgerald et al. | |
| 5,596,742 A | 1/1997 | Agarwal et al. | |
| 5,606,665 A | 2/1997 | Yang et al. | |
| 5,611,049 A | 3/1997 | Pitts | |
| 5,663,018 A | 9/1997 | Cummings et al. | |
| 5,752,023 A | 5/1998 | Choucri et al. | |
| 5,761,484 A | 6/1998 | Agarwal et al. | |
| 5,768,423 A | 6/1998 | Aref et al. | |
| 5,774,660 A | 6/1998 | Brendel et al. | |
| 5,826,242 A | 10/1998 | Montulli | |
| 5,835,724 A | 11/1998 | Smith | |
| 5,848,412 A | 12/1998 | Rowland et al. | |
| 5,862,325 A | 1/1999 | Reed et al. | |
| 5,867,495 A | 2/1999 | Elliott et al. | |
| 5,867,706 A * | 2/1999 | Martin et al. | 718/105 |
| 5,875,296 A | 2/1999 | Shi et al. | |
| 5,892,914 A | 4/1999 | Pitts | |
| 5,919,247 A | 7/1999 | Van Hoff et al. | |
| 5,936,939 A | 8/1999 | Des Jardins et al. | |
| 5,946,690 A | 8/1999 | Pitts | |
| 5,949,885 A | 9/1999 | Leighton | |
| 5,959,990 A | 9/1999 | Frantz et al. | |
| 5,961,606 A | 10/1999 | Talluri et al. | |
| 5,963,915 A | 10/1999 | Kirsch | |
| 5,974,460 A | 10/1999 | Maddalozzo, Jr. et al. | |
| 5,983,281 A | 11/1999 | Ogle et al. | |
| 5,991,878 A | 11/1999 | McDonough et al. | |
| 6,006,259 A | 12/1999 | Adelman et al. | |
| 6,006,260 A | 12/1999 | Barrick, Jr. et al. | |
| 6,006,264 A | 12/1999 | Colby et al. | |
| 6,012,090 A * | 1/2000 | Chung et al. | 709/219 |
| 6,014,710 A | 1/2000 | Talluri et al. | |
| 6,026,452 A | 2/2000 | Pitts | |
| 6,028,857 A | 2/2000 | Poor | |
| 6,041,357 A | 3/2000 | Kunzelman et al. | |
| 6,047,268 A | 4/2000 | Bartoli et al. | |
| 6,051,169 A | 4/2000 | Brown et al. | |
| 6,076,108 A | 6/2000 | Courts et al. | |
| 6,078,956 A | 6/2000 | Bryant et al. | |
| 6,085,234 A | 7/2000 | Pitts et al. | |
| 6,088,717 A | 7/2000 | Reed et al. | |
| 6,092,196 A | 7/2000 | Reiche et al. | |
| 6,098,093 A | 8/2000 | Bayeh et al. | |
| 6,101,482 A | 8/2000 | DiAngelo et al. | |
| 6,108,703 A | 8/2000 | Leighton et al. | |
| 6,111,876 A | 8/2000 | Frantz et al. | |
| 6,134,592 A | 10/2000 | Montulli | |
| 6,138,142 A | 10/2000 | Linsk | |
| 6,161,139 A | 12/2000 | Win et al. | |
| 6,163,806 A | 12/2000 | Viswanathan et al. | |
| 6,170,017 B1 | 1/2001 | Dias et al. | |
| 6,182,142 B1 | 1/2001 | Win et al. | |
| 6,185,567 B1 | 2/2001 | Ratnaraj et al. | |
| 6,185,598 B1 | 2/2001 | Farber et al. | |
| 6,209,038 B1 | 3/2001 | Bowen et al. | |
| 6,212,565 B1 | 4/2001 | Gupta | |
| 6,225,995 B1 | 5/2001 | Jacobs et al. | |
| 6,226,750 B1 | 5/2001 | Trieger | |
| 6,247,050 B1 | 6/2001 | Tso et al. | |
| 6,247,056 B1 | 6/2001 | Chou et al. | |
| 6,253,230 B1 | 6/2001 | Couland et al. | |
| 6,266,335 B1 | 7/2001 | Bhaskaran | |
| 6,272,523 B1 | 8/2001 | Factor | |
| 6,279,001 B1 | 8/2001 | DeBettencourt et al. | |
| 6,317,786 B1 | 11/2001 | Yamane et al. | |
| 6,327,609 B1 | 12/2001 | Ludewig et al. | |
| 6,330,566 B1 | 12/2001 | Durham | |
| 6,334,114 B1 | 12/2001 | Jacobs et al. | |
| 6,345,288 B1 | 2/2002 | Reed et al. | |
| 6,345,303 B1 | 2/2002 | Knauerhase et al. | |
| 6,351,775 B1 | 2/2002 | Yu | |
| 6,360,262 B1 | 3/2002 | Guenthner et al. | |
| 6,360,270 B1 | 3/2002 | Cherkasova et al. | |
| 6,374,300 B2 | 4/2002 | Masters | |
| 6,374,359 B1 | 4/2002 | Shrader et al. | |
| 6,385,642 B1 | 5/2002 | Chlan et al. | |
| 6,389,462 B1 | 5/2002 | Cohen et al. | |
| 6,397,253 B1 | 5/2002 | Quinlan et al. | |
| 6,415,322 B1 | 7/2002 | Jaye | |
| 6,421,768 B1 | 7/2002 | Purpura | |
| 6,424,992 B2 | 7/2002 | Devarakonda et al. | |
| 6,430,618 B1 | 8/2002 | Karger et al. | |
| 6,438,597 B1 | 8/2002 | Mosberger et al. | |
| 6,446,117 B1 | 9/2002 | Gebauer | |
| 6,453,353 B1 | 9/2002 | Win et al. | |
| 6,460,071 B1 | 10/2002 | Hoffman | |
| 6,460,079 B1 | 10/2002 | Blumenau | |
| 6,470,389 B1 | 10/2002 | Chung et al. | |
| 6,473,802 B2 | 10/2002 | Masters | |
| 6,490,624 B1 | 12/2002 | Sampson et al. | |
| 6,510,464 B1 | 1/2003 | Grantges, Jr. et al. | |
| 6,557,038 B1 | 4/2003 | Becker et al. | |
| 6,587,959 B1 | 7/2003 | Sjolander et al. | |
| 6,594,260 B1 | 7/2003 | Aviani et al. | |
| 6,594,692 B1 | 7/2003 | Reisman | |
| 6,970,933 B1 | 11/2005 | Masters | |
| 7,047,301 B2 | 5/2006 | Skene et al. | |
| 7,080,158 B1 | 7/2006 | Squire | |
| 7,146,505 B1 | 12/2006 | Harada et al. | |
| 2002/0007413 A1 | 1/2002 | Garcia-Luna-Aceves et al. | |

FOREIGN PATENT DOCUMENTS

| | | |
|---|---|---|
| EP | 0744850 | 11/1996 |
| WO | 9114326 | 9/1991 |
| WO | 9505712 | 2/1995 |
| WO | 9709805 | 3/1997 |
| WO | 9745800 | 12/1997 |
| WO | 9905829 | 2/1999 |
| WO | 9906913 | 2/1999 |
| WO | 9910858 | 3/1999 |
| WO | 9939373 | 8/1999 |
| WO | 9964967 | 12/1999 |
| WO | WO 99/64967 | 12/1999 |
| WO | 0004422 | 1/2000 |
| WO | 0004458 | 1/2000 |
| WO | 0169890 | 9/2001 |
| WO | PCT/US01/07574 | 9/2001 |
| WO | WO 01/69890 | 9/2001 |

OTHER PUBLICATIONS

Office Communication for U.S. Appl. No. 10/006,555 dated Apr. 12, 2002.*

Office Communication for U.S. Appl. No. 11/284,035 dated Dec. 22, 2004.*

Office Communication for U.S. Appl. No. 11/284,035 dated Apr. 14, 2004.*

Office Communication for U.S. Appl. No. 11/260,651 dated Apr. 9, 2007.*

Office Communication for U.S. Appl. No. 11/260,651 dated Nov. 28, 2006.*

Office Communication for U.S. Appl. No. 11/260,651 dated Oct. 12, 2006.*
Office Communication for U.S. Appl. No. 11/235,643 dated Jan. 8, 2007.*
"Review Guide," IBM WebSphere Performance Pack for Multiplatforms, Version 2.0, International Business Machines Corporation, Mar. 1999, 32 pp.
Hunt, Guerney D.H. et al., "Network Dispatcher: a connection router for scalable Internet services," date unknown, 11 pp.
Engelschall, Ralf S., "Load Balancing Your Web Site," Web Techniques Magazine, vol. 3, Issue 5, May 1998, 8 pp.
"IBM WebSphere Application Server Version 3.0.2.2. Release Notes," Updated Dec. 8, 2000, 33 pp.
"Balancing User-Request Loads," Chapter 13, Netscape Communications Corp., 1999, 10 pp.
"Creating and Managing User Sessions," 1999, Netscape Communications Corp., 5 pp.
"Enabling the Information Age," Web Application Server 4.0, Oracle, date unknown, 18 pp.
"Maximum Performance with Fine-Grained Control: A Requirement for E-Business Applications and Services," Whitepaper, Resonate, Inc., Aug. 1999, 10 pp.
"Distributed Traffic Management," Central Dispatch Data Sheet, Resonate, Inc., 1999, 2 pp.
"Who do SSL connections to IE browsers periodically time out," Question 8.2, Zeus Technology, date unknown, 5 pp.
"Session Tracking," Chapter 9, Prentice Hall and Sun Microsystems, date unknown, 30 pp.
Chow, Edward, "Advanced Load Balancing/Web Systems," Departemnt of Computer Science, University of Colorado at Colorado Springs, Jun. 21, 2000, 82 pp.
Schroeder, Trevor et al, "Scalable Web Server Clustering Technologies,", IEEE Network, May/Jun. 2000, 8 pp.
Cardellini, Valeria et al., "The State of the Art in Locally Distributed Web-Server Systems," ACM Computing Surveys, vol. 34, No. 2, Jun. 2002, 49 pp.
Kristol, David M., "HTTP Cookies: Standards, Privacy and Politics," Lucent Technologies, 2001, 49 pp.
Kristol, David M., "Proposed HTTP State-Info Mechanism," AT&T Bell Laboratories, HTTP Working Group, Internet Draft Sep. 22, 1995, 8 pp.
Moore, Keith, "Applicability Statement for HTTP State Management," University of Tennessee, Network Working Group, Internet Draft, Nov. 18, 1998, 7 pp.
Babir, A. et al, "Known CN Request-Routing Mechanism," Nortel Networks et al., Network Working Group, Internet Draft, Apr. 3, 2003, 22 pp.
Kristol, D. et al., "HTTP State Management Mechanism," Bell Laboratories et al., Network Working Group, Request for Comments: 2109, Category: Standards Track, Feb. 1997, 21 pp.
Kristol, David M., "HTTP Proxy State Management Mechanism," Bell Laboratories, Lucent Technologies, HTTP Working Group, Internet Draft, May 26, 1998, 6 pp.
"Persistent Client State HTTP Cookies," Netscape Communications Corp., 1999, 5 pp.
Mogul, Jeffrey C., "The Case for Persistent-Connection HTTP," SIGCOMM '95, Cambridge, Massachusetts, 1995, pp. 299-313.
"Proposals for Gathering Consumer Demographics," publication unknown, Oct. 1995, 5 pp.
Srisuresh, P. et al., "Load Sharing using IP Network Address Translation (LSNAT)," Lucent Technologies et al., Network Working Group, Request for Comments: 2391, Category Informational, Aug. 1998, 18 pp.
Hallam-Baker, P. et al., "Session Identification URI," W3C Working Draft, WD-session-id-960221, date unknown, 7 pp.
Lavoie, B. et al., "Web Characterization Terminology & Definitions Sheet," W3C Working Draft, May 24, 1999, 12 pp.
Schemers, Roland J. III, "lbnamed: A Load Balancing Name Server in Perl," 1995 LISA IX, Sep. 17-25, 1995, Montery, California, 11 pp.
Chu, Chi, "IP Cluster," Research 2000, Inc. Aug. 1996, 7 pp.
"Resonate Introduces Resonate Dispatch, A Distributed Server Management Solution For Multi-Server Internet/Intranet Sites," News Release by Resonate, Inc., Dec. 9, 1996, 3 pp.

Damani, Om P. et al., "ONE-IP: techniques for hosting a service on a cluster of machines," Computer Networks and ISDN Systems 29 (1997), Elsevier Science B.V., 1997, pp. 1019-1027.
Goldszmidt, G. et al., "NetDispatcher: A TCP Connection Router," IBM Research Report, IBM Research Division, Yorktown Heights, New York, May 19, 1997, 32 pp.
Goldszmidt, G., "Load Management for Scaling up Internet Services," IEEE, 1998, pp. 828-835.
Pai, Vivek S. et al., "Locality-Aware Request Distribution in Cluster-based Network Servers," publication unknown, date unknown, 12 pp.
Doyle, Michelle et al., "On balancing client-server load in intelligent web-based applications involving dialog," Department of Computer Science, Trinity College Dublin 2 Ireland, publication unknown, date unknown, 28 pp.
Cherkasov, Ludmilla, "FLEX: Design and Management Strategy for Scalable Web Hosting Service," Hewlett-Packard Company, 1999, 38 pp.
Abdelzaher, Tarek F. et al., "Web Server QoS Management by Adaptive Content Delivery," publication unknown, date unknown, 10 pp.
Brooks, Charles et al., "Application-Specific Proxy Servers as HTTP Stream Transducers," publication unknown, date unknown, 9 pp.
Voigt, Thiemo et al., "Handling Persistent Connections in Overloaded Web Servers," publication unknwon, date unknown, 2 pp.
Voigt, Thiemo et al., "Handling Persistent Connections in Overloaded Web Servers," publication unknown, date unknown, 12 pp.
Cardellini, Valeria et al., "Dynamic Load Balancing on Web-server Systems" IEEE Internet Computing, IEEE, vol. 3, No. 3, 1999, 24 pp.
Andressen, Daniel et al., "Towards a Scalable Distributed WWW Server on Workstation Clusters," publication unknown, date unknown, 16 pp.
Voigt, Thiemo et al., "Handling Persistent Connections in Overloaded Web Servers," Swedish Institute of Computer Science and Uppsala University, undated slide presentation, 17 pp.
Perrochon, Louis, "Translation Servers: Gateways Between Stateless and Stateful Information Systems," Institut for Informationsysteme, publication unknwon, date unknown, 11 pp.
"Sprint Introduces Global Internet VPN Service," A Daily Journal for Broadband Networking, ATM News, Inc., 1999, 3 pp.
Bhatti, Nina et al., "Web Server Support for Tiered Services," Hewlett-Packard Research Labs, Palo Alto, California, publication unknown, date unknown, 16 pp.
Fox, Armando et al., "Experience With Top Gun Wingman: A Proxy-Based Graphical Web Browser for the 3Com PalmPilot," University of California at Berkley, publication unknown, date unknown, 18 pp.
Zenel, Bruce, "A Proxy Based Filtering Mechanism for the Mobile Environment," Columbia University doctoral dissertation, 1998, 234 pp.
"AC200 and AC300—Release 2.0 Bandwidth Management Solutions," Allot Communications, Inc., Nov. 6, 1998, 5 pp.
"WebOS 8.3 Feature Overview," Alteon Web Systems, undated Confidential slide presentation, 26 pp.
"WebOS 9.0," Alteon Web Systems, undated Confidential slide presentation, 16 pp.
"A Process For Selective Routing of Servlet Content To Transcoding Modules," Research Disclosure 422124, IBM Corporation, pp. 889-890, Jun. 1999.
"Adding Scalability and Availability to TCP/IP Serives," Coyote Point Systems, Inc., Sunnyvale, California, 1998, 4 pp.
"Be Free Handles a Billion Online Impressions Per Quarter with Coyote Point's Equalizer Load Balancer," Coyote Systems, Inc., 2003, 4 pp.
"Choosing The Right SSL Acceleration Device For Your E-Business," F5 Networks, 2003, 10 pp.
"Coyote Point's Adaptive Load Balancer, the Equalizer, to Work in Tandem with Bright Tiger's ClusterCATS Web Site Resource Management Software," Coyote Point Systems, Jan. 4, 1999, 3 pp.
"Equalizer," Coyote Point Systems, Inc., publication unknown, 2003, 2 pp.
"Getting Started," IBM WebSphere Performance Pack for Multiplatforms, Version 3.0, International Business Machines Corporation, Aug. 1999, 107 pp.
"Networkers," Cisco Systems, Inc., 2001, 47 pp.

"Servlet/Applet/HTML Authentication Process With Single Sign-On," Research Disclosure 429128, IBM Corporation, Jan. 2000, pp. 163-164.

"The Next Step in Server Load Balancing," Alteon Web Systems, Inc., White Paper dated Nov. 1999, 15 pp., San Jose, California.

Acuitive, Inc., "Virtual Resource Management: Industry Update and Analysis," Research Report 00001, Mar. 2000, p. 37 and p. 47.

Acuitive, Inc., "Virtual Resource Management: Industry Update and Analysis," Product Version 1.0, Mar. 2000, 47 pp.

Acuitive, Inc., "Virtual Resource Management: Which Vendor is Right for You?" Product Version 3.0, Mar. 2000, 136 pp.

Anderson, Paul and James, Gail, "Performance Soars, Features, Vary," Network World Fusion, Jun. 14, 1999, 5 pp., www.nwfusion.com.

Arrowpoint Comunications, "A Comparative Analysis of Web Switching Architectures," 12 pp., www.arrowpoint.com/switch/index.html.

Arrowpoint Communications, "A Comparative Analysis of Web Switching Architectures," Jun. 2000, Abstract (2 Pages) and Article (12 Pages), www.knowware.co.uk.com.

Arrowpoint Communications, "ArrowPoint and CUBE Technologies Team to Deliver 100% Uptime and E-Transactions Services . . . Business Wire," Apr. 12, 1999, 3 pp., Westford, MA.

Arrowpoint Communications, "ArrowPoint Communications Wins 1999 Hot Product Award from Data Communications Magazine," Press Release, Jan. 8, 1999, 1 pp., Westford, MA.

Arrowpoint Communications, "ArrowPoint—When Web Performance is Your Business," Internetweek.com, Oct. 21, 1999, 4 pp., www.internetwk.com.

Arrowpoint Communications, "Frequently Asked Questions (about ArrowPoint Communications)," Feb. 14, 2003, 3 pp., www.knowware.co.uk.com.

Bizyayev, Slava, "Tutorials: Building a Large-Scale E-commerce site with Apache and moc_perl," publication unknown, Mar. 15, 2004, 106 pp.

Brooks, Roseann Mcgrath, "Sapphire/Web: A Gem Of An Integration Solution," ENT, May 20, 1998, p. 69, vol. 9, No. 3.

Canover, Joel, "ArrowPoint CSS-100 Switch: Layer-By-Layer Load-Balancing," Nov. 11, 2002, 3 pp., www.networkcomputing.com.

Caruso, Jeff, "Vendors up load -balancing ante," Network World, Inc., Nov. 15, 1999, 4 pp.

Caruso, Jeff, "Cookies Are the Rage in Load-Balancing Switches," Network World Fusion, Jan. 26, 2000, pp. 3 of 6, www.nwfusion.com.

Caruso, Jeff, "Foundry Extends Server Load-Balancing Reach," Network World Fusion, Jan. 17, 2000, pp. 2 of 6, www.nwfusion.com.

Caruso, Jeff, "Resonate Sticks Its Hand in the 'Cookie' Jar," Network World Fusion, Dec. 6, 1999, pp. 2 of 5, www.nwfusion.com.

Cisco Systems, Inc., "How ArrowPoint Cookies Functions on the CSS 11000 Series In 4.x Code," Nov. 7, 2002, 9 pp., www.cisco.com.

Eddy, Andy, "ArrowPoint Targets Overloaded Server Farms," Network World, Apr. 13, 1998, 3 pp., www.nwfusion.com.

Email from Josh Hildebrand to Rob Gilde, F5 Networks, dated Sep. 10, 1998, 3 pp.

Fielding, R. et al., "RFC 2068, Hypertext Transfer Protol—HTTP/1.1," Network Working Group, Request for Comments: 2068, Category: Standards Track, Internet RFC/STD/FYI/BCP Archives, Jan. 1997, 115 pp.

Gage, Chris, "IBM SecureWay Network Dispatcher Version 2.1: Scalability, Availability, and Load-Balancing for TCP/IP Applications," Apr. 1999, 2 pp., North Carolina.

Gage, Christopher, "SecureWay Network Dispatcher Version 2.1: Scalability, Availability and Load-Balancing for TCP/IP Applications," IBM, Apr. 1999, 15 pp., South Carolina.

Harbaugh, Logan G., "Balancing the Load," Internetweek.com, Jan. 25, 1999, 9 pp., www.internetwk.com.

Herringshaw, Chris, "Tuning Web Site Performance," excerpted from Network Magazine, Nov. 15, 1997, 3 pp.

Hunt, Guerney et al., "Enabling Content-Based Load Distribution for Scalable Services," publication unknown, date unknown, 5 pp.

IBM U.S. Announcement Letter, "IBM WebSphere Performance Pack Delivers Quality Serivce with Enhanced Functions," Mar. 16, 1999, 13 pp., www.ibmlink.ibm.com.

IBM, "About IBM Network Dispatcher Features," Sep. 23, 2003, 4 pp., mhtml: file://M:.backslash. '802%20patent%20(cookie%)persistence).backslash. Related%20art%20research.com.

IBM, "User's Guide: SecureWay Network Dispatcher; Version 2.1 for AIX, Solaris, and Windows Nt," Mar. 1999, 84 pp.

Infoliberia, Inc., "ArrowPoint and InfoLibria Announce Scalable Solution to Improve Web Performance and Availability," Press Release, Jun. 2, 1999, 3 pp., Westford, MA.

Lin, Wei-Jyh and Chen, Kung, "A Database Application Generator for the WWW," Journal of the Chinese Institute of Engineers, 1998, pp. 337-346, vol. 21, No. 3.

Lucent Technolgies, "Lucent Signs OEM Agreement for ArrowPoint Web Switches," Press Release, Apr. 26, 1999, 3 pp., Westford, MA.

Network Applicance, "Arrowpoint Communications And Network Applicance Team To Optimize Web Caches And Scalability," Press Release. Nov. 16, 1998, 2 pp., Westford, MA.

Network World Fusion, "Response to Load-Balancing RFP: Arrowpoint," Jun. 13, 1999, 5 pp., www.nwfusion.com.

Pistoia, Marco and Letilley, Corinne, "IBM WebSphere Performance Pack Load Balancing with IBM SecureWay Network Dispatcher," SG24-5858-00, Dec. 4, 2002, 1 Page abstract.

Pistoia, Marco and Letilley, Corine, "IBM WebSphere Performance Pack Load Balancing with IBM SecureWay Network Dispatcher," Oct. 1999, 349 pp., www.redbooks.ibm.com.

Pistoia, Marco and Letilley, Corinne, "IBM WebSphere Performance Pack: Load Balancing with IBM SecureWay Network Dispatcher," 428 pp., Oct. 1999, www.redbooks.ibm.com.

Response to Load-Balancing RFP: ArrowPoint. Network World Fusion. Jun. 13, 1999. 5 Pages. www.wfusion.com.

Response to Load-Balancing RFP: Foundry. Network World Fusion. Jun. 13, 1999. 2 Pages. www.nwfusion.com.

Riggs, Brian. Switchmakers Aim to Make Online Shopping Easier. Information Week Online. Nov. 15, 1999. 2 Pages. www.infomraitonweek.com.

Slide Presentation, First page titled, "Overview," HY359 (remainder of text in a slavic language), May 4, 2004, 28 pp.

Taylor, Art. Java-Charging The Data Warehouse. Database Programming & Design. Oct. 1997. 58 Pages. vol. 10, No. 10.

Transcript of videotaped deposition of Daniel Matte, F5 Networks, Inc., Mar. 23, 2004, (pp. 77-88), 3 pp.

Transcript of videotaped deposition of Daniel Matte, F5 Networks, Inc., Apr. 22, 2004, (pp. 65-68), 1 pp.

Varma, Vik, "A Solution to Redundant, Load Balanced Firewall Systems," publication unknown, 1998, 6 pp.

Wu, Cheng. Web Switches Help Reduce Net Traffic. Network World. Mar. 29, 1999. 4 Pages. www.nwfusion.com.

Yang, Chu-Sing and Luo, Mon-Yen. Efficient Support for Content-Based Routing in Web Server Clusters. 2nd USENIX Symposium, 1999. pp. 221-232. Kaohsiung, Taiwan.

Zimmerman, Christine. Alteon Offers A Cookie-Cutter Approach to Load Balancing. InternetWeek.com. Nov. 8, 1999, 1 Page. www.internetwk.com.

Hewitt, John R. et al., "Securities Practice And Electronic Technology," Corporate Securities Series, (New York: Law Journal Seminars-Press) 1998, title page, bibliography page, pp. 4.29-4.30.

Reardon, Marguerite, "A Smarter Session Switch: Arrowpoint's CS Session Switches Boast The Brains Needed For E-Commerce," Data Communications, Jan. 1999, title page, pp. 3, 5, 18.

* cited by examiner

OVERVIEW OF HTTP REQUEST W/COOKIE

ASSOCIATIVE / HTTP
REQUEST W/O COOKIE

PASSIVE / HTTP
REQUEST W/O COOKIE

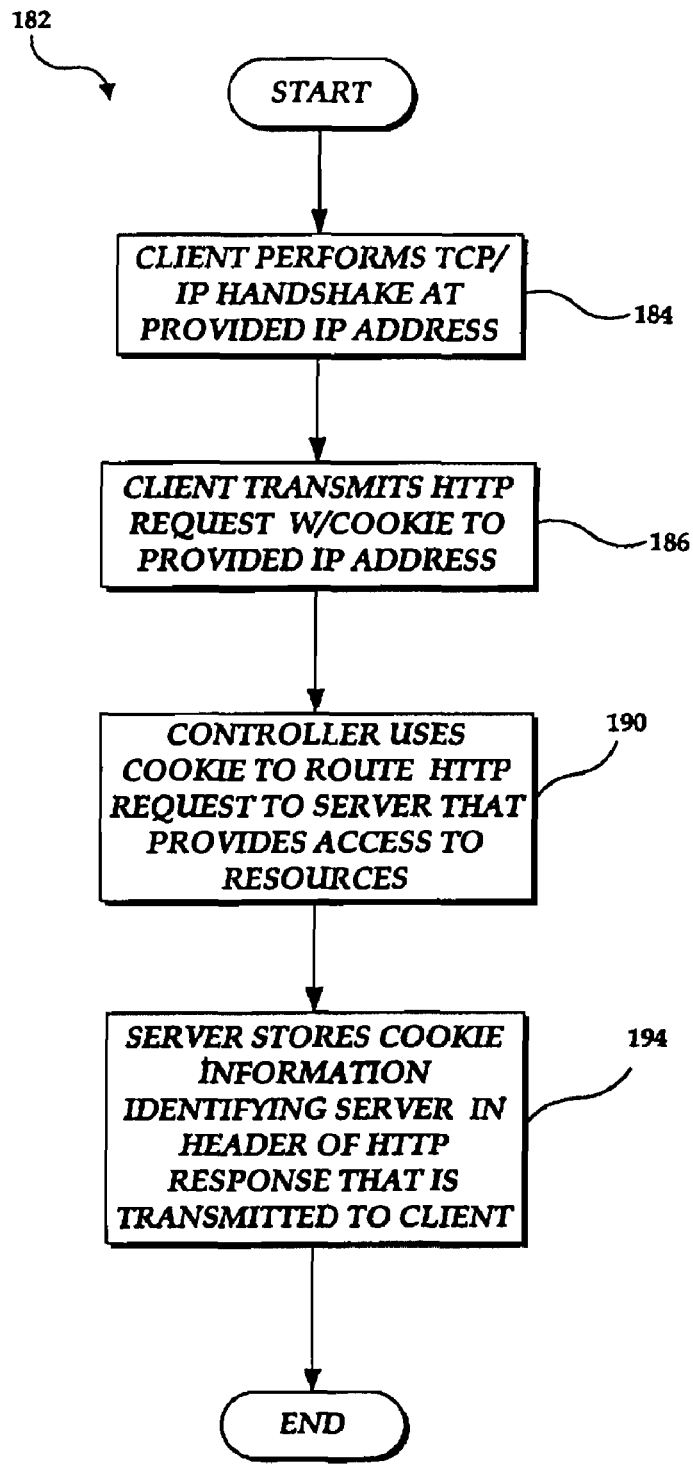
PASSIVE/HTTP
REQUEST W/COOKIE   *FIG. 4B*

REWRITE / HTTP
REQUEST W/O COOKIE

REWRITE / HTTP
REQUEST W/COOKIE

INSERT / HTTP
REQUEST W/O COOKIE

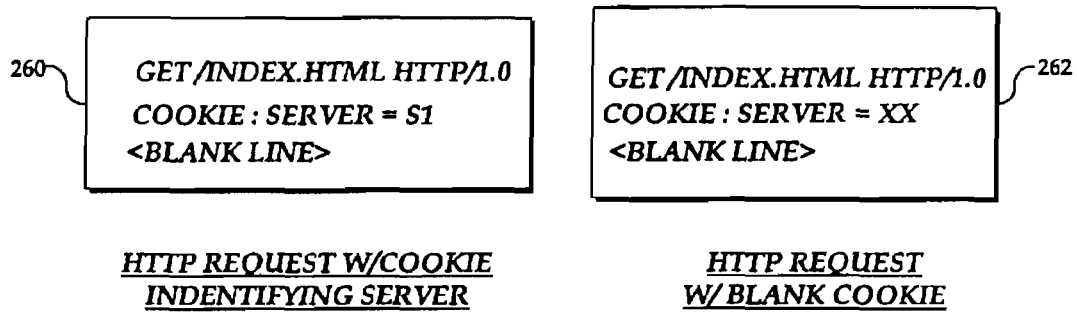
FIG. 7A HTTP REQUEST W/COOKIE INDENTIFYING SERVER
FIG. 7B HTTP REQUEST W/ BLANK COOKIE
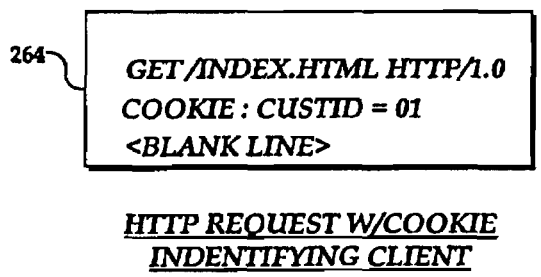
FIG. 7C HTTP REQUEST W/COOKIE INDENTIFYING CLIENT
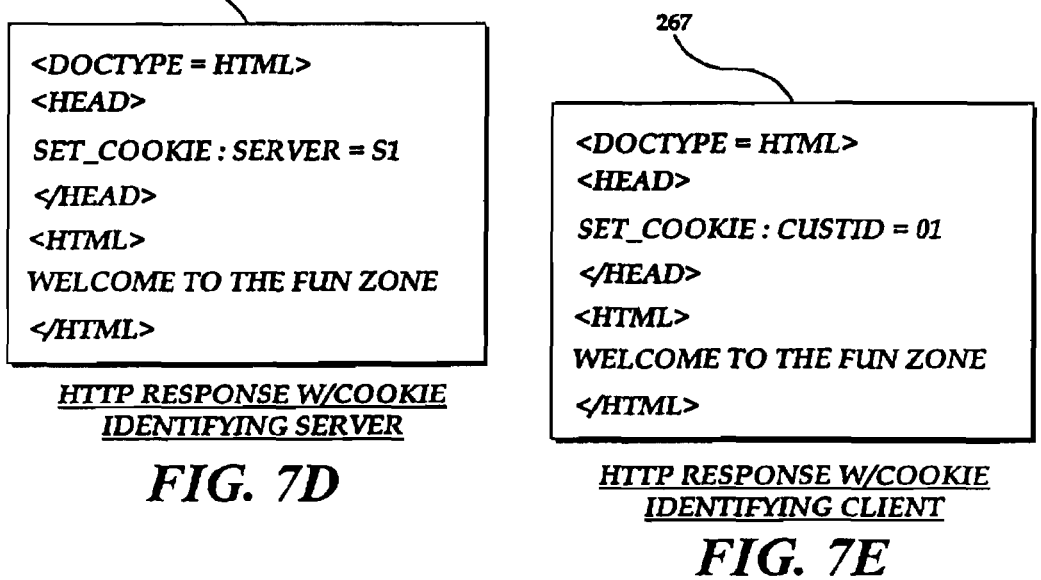
FIG. 7D HTTP RESPONSE W/COOKIE IDENTIFYING SERVER
FIG. 7E HTTP RESPONSE W/COOKIE IDENTIFYING CLIENT

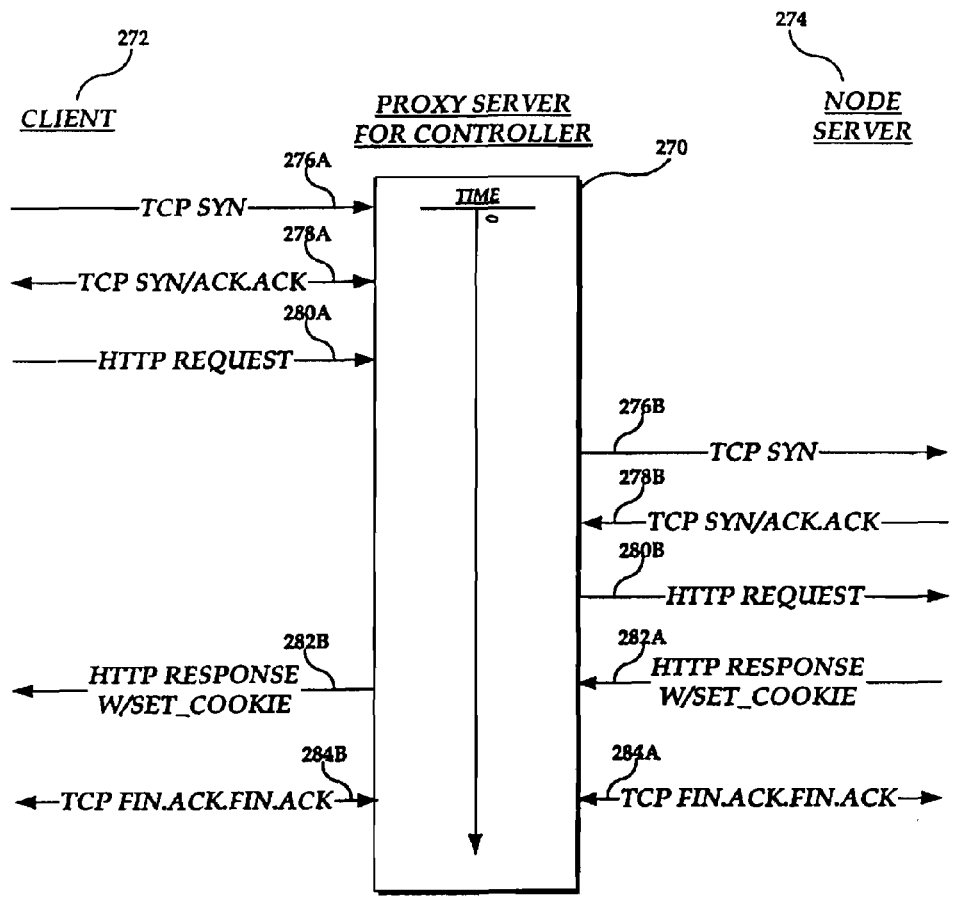
FIG. 8

SYSTEM AND METHOD FOR PERFORMING APPLICATION LEVEL PERSISTENCE

RELATED APPLICATIONS

This Utility Patent application is a divisional of U.S. patent Ser. No. 11/260,651, filed Oct. 26, 2005, which is a divisional of U.S. patent Ser. No. 10/284,035, filed on Oct. 28, 2002, and a continuation of U.S. patent Ser. No. 11/235,643, filed on Sep. 26, 2005, the priority of which is hereby claimed under 35 U.S.C. 120.

FIELD OF THE INVENTION

This application relates generally to distributing the load demand between servers on a network, and, more specifically, to employing an HTTP cookie to balance the load demand between servers on a wide area network of geographically distributed servers such as the Internet.

BACKGROUND OF THE INVENTION

Generally, it has proven difficult to reliably and efficiently load balance the demand for access to resources, e.g., a web-based application, email and streamed multimedia data, on a wide area network (WAN). One prior art attempt employed a look up table for storing a relationship mapping between a client's ip address and the ip address of the actual server that provided access to the resources for a domain name/ip address request. This table was usually held in the memory of a server array controller that managed several node servers that could provide access to the resources associated with the client's request. Typically, the server array controller would employ a load balancing technique to select and map the ip address of one of the managed node servers to the client's actual ip address and store this mapped relationship with a time stamp in the table. In this way, when a client repeated a request before the expiration of the time stamp, the controller would use the mapping stored in the table to automatically connect the client to the previously selected (load balanced) node server.

Additionally, if the time stamp had expired, the server array controller would again perform the load balancing technique to select one of the managed node servers to provide the actual access to the resources associated with the request. Each time the load balancing technique was performed, the controller would update the table to include a new time stamp and a new mapping of the client's unique ip address to the currently selected node server's ip address.

For a relatively small number of client requests, the above described prior art solution could reduce the demand on server array controller resources because the controller did not always have to perform a load balancing technique for each client request that occurred before the expiration of the time stamp. Instead, the controller only performed the load balancing technique for a new client request when the time stamp for a previous client request was expired. However, since all of the table entries had to be kept in the memory of the server array controller to be used effectively, the available controller resources for load balancing and managing several node servers decreased in proportion to an increase in the number of client requests. To ensure that table entries were not lost when the server array controller lost power or was rebooted, a copy of the table would be stored on a secondary storage medium. Also, under heavy load conditions, the secondary storage medium was often not fast enough to store the copy of table entries before the server array controller shut down.

Another significant problem with the prior art approach was that the client's ip address was not always unique. Although some clients might have their own unique ip address, many others used random virtual client ip addresses provided by a large Internet Service Provider (ISP), e.g., the America On-Line Corporation, to connect to the Internet. Since only a portion of a large ISP's clients are typically connected at any one time, a large ISP usually employs a proxy cache to randomly assign a relatively small number of virtual client ip addresses to the currently "on-line" (customers) clients. Typically, a proxy cache will assign one of the virtual client ip addresses to a client on a first available basis each time the client connects to the ISP and starts a session on the Internet. From the discussion above, it is apparent that when a client used a large ISP to connect to a WAN such as the Internet, the prior art did not provide an effective method for persistently mapping a client's relationship to the server that was selected to provide access to resources associated with a request.

Therefore, it is desirable to provide a method and system for automatically providing a persistent mapping of a previously selected destination for a domain name/ip address request. Preferably, the present invention employs a Cookie in a Hyper Text Transport Protocol (HTTP) data stream to identify a relationship between a previously selected destination and a client's HTTP request. The present invention overcomes many of the limitations of the prior art caused by the direct mapping of an actual destination ip address to a client's ip address.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4B is a flow chart illustrating a passive mode for processing an HTTP request that does include a Cookie;

FIGS. 7A-7C show exemplary code fragments of HTTP requests that include Cookies;

FIGS. 7D and 7E illustrate exemplary code fragments of HTTP responses that include information for setting Cookies at the senders of the associated HTTP requests;

FIG. 8 shows the buffering of communication between a client and a node server by a proxy server.

DETAILED DESCRIPTION OF THE PREFERRED EMBODIMENT

Figure 1A:
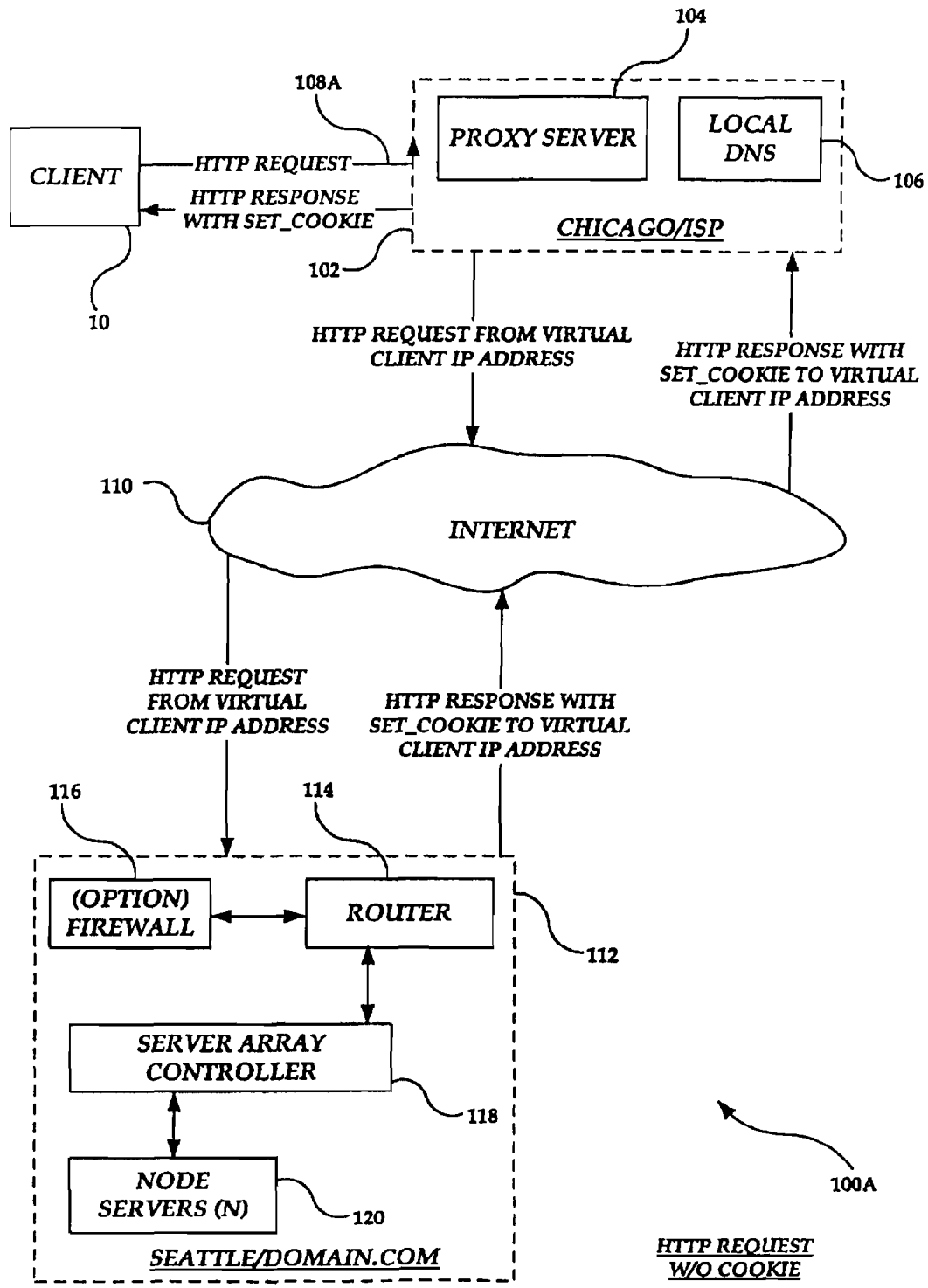
FIG. 1A is a schematic overview of a system for processing an HTTP request that does not include a Cookie.

The present invention is directed to inserting and examining HTTP Cookies in the data streams of HTTP connections for the purpose of persistently directing HTTP connections to the same destination. The present invention enables a network transmission device, e.g., a router, to reliably and conveniently direct subsequent HTTP connections from the same client to the same server for accessing requested resources.

HTTP is an application level protocol for transferring resources across the Internet, e.g., a network data object or server, and it is specified by the URL. The Hyper Text Markup Language (HTML) is a simple data format that is used to create hypertext documents that are supported by the HTTP protocol. Together, these standards have contributed to create the World Wide Web (WWW) on the Internet. The WWW is a globally accessible and platform-independent hypermedia information system that has become a central access point to applications and services for people around the world.

A Cookie is a general mechanism, i.e., protocol, which server side connections can use to both store and retrieve information on the client side of the connection. The addition of a simple, persistent, client-side state significantly extends the capabilities of Internet-based client/server application programs. A server, when returning an HTTP object to a client, may also send a piece of state information which the client may store. Included in that state object is a description of the range of Uniform Resource Locators (URLs) for which the returned state is valid. Any future HTTP requests made by the client which fall in that range will include a transmittal of the current values of the state object from the client back to the sender. This state object is called a "Cookie," for no compelling reason.

The Cookie mechanism provides a powerful tool that enables different types of application programs to be written for Internet-based environments. For example, a service program could use a Cookie to send back registration information and free the client from retyping a user identification number for each connection to the service. Also, an Internet site could store user preferences for a client and have the client supply those preferences each time that the client connected to the site.

Generally, a Cookie is introduced to the client by including information with a Set-Cookie command in a header as part of an HTTP response. An example of the Set-Cookie command included in an HTTP response header is listed below.

<HEADER>
Set-Cookie: NAME=VALUE, expires=DATE;
path=PATH, domain=DOMAIN NAME, secure
</HEADER>

When a client's browser program is requesting a URL from an HTTP server on the Internet, the browser will match the requested URL against all of the URLs stored in the client's Cookies. If the requested URL matches any of the stored URLs, a line containing the name/value pairs of all matching Cookies will be included in the HTTP request. An exemplary line in a Cookie for an HTTP request could be included as follows: Cookie. NAME1=OPAQUE STRING1; NAME2=OPAQUE STRING2.

A Cookie is typically used to save the state of a relationship between a client and a server. However, in some cases, the saved state of the relationship may create a load balancing problem. For example, each node server that is managed by a load balancing server array controller may not always share the same state relationship with the client that is saved in the Cookie. In this case, the controller must persistently send a repeated client HTTP request to the same node server because it is difficult to recreate the same state relationship in another server during the HTTP request/response session.

Although the saved state relationship in a Cookie can create a load balancing problem, the present invention uses the Cookie mechanism to offer a solution to this problem by enabling a network transmission device, e.g., a switch, Internet router, and/or a server array controller, to insert and/or examine Cookies in the data streams of HTTP connections for the purpose of reliably, conveniently and persistently directing connections to the same destination, e.g., a node server. Preferably, the network transmission device actively inserts data into or modifies the HTTP data stream from a server so that a Cookie can be saved by the client indicating the state relationship between the client and the server. In this way, the transmission device can use the Cookie returned in a subsequent client HTTP request to direct the current connection to the same server.

System Overview

FIG. 1A illustrates a system overview 100A of the data flow for an HTTP request/response for accessing resources associated with a domain name resolved into an Internet protocol (ip) address or an ip address that is directly provided by a client 10. In this example, the client 10 starts a session by connecting with an ISP 102 (located in Chicago, Ill.) over a communication medium. For example, the client may connect to the local ISP through a telephone modem, cable modem and/or satellite connection. The local ISP 102 usually provides a local domain name system (DNS) server 106 that communicates with other servers on the WAN for resolving a domain name request into an ip address when the client provides a domain name for accessing resources.

The client 10 sends an HTTP request 108A to the local ISP 102 for access to resources associated with an ip address that is either resolved or directly provided. A proxy server 104 will assign and add its first available virtual client ip address to the HTTP request 108A, so that the client 10 is identifiable during the current session. In the case where the HTTP request 108A identifies a domain name associated with the resource instead of an ip address, the local DNS server 106 employs a distributed database to resolve the domain name into the ip address for the requested resource.

The proxy server 104 sends the HTTP request 108A over the Internet 110 to a data center 112 located in Seattle, Wash., which is identified to be associated with the requested domain name ("domain.com") or ip address. A router 114, (optional) firewall 116, server array controller 118 and an intranet of N node servers 120 are disposed at the data center 112. The server array controller 118 is used to manage and load balance network traffic on the intranet of node servers 120.

In one embodiment, the server array controller 118 intelligently distributes web site connections across arrays (pools) of node servers, transparent firewalls, transparent cache servers, routers as well as other router-like devices. The controller 118 may manage connections to multiple Internet or intranet sites, and it can support a wide variety of Internet protocols and services such as TCP/IP (transmission control protocol/Internet protocol) and HTTP. It is understood that the TCP/IP protocol actually represents a suite of communications protocols that are used to connect hosts on the Internet.

Each node server is defined by a specific combination of a node address and a node port number on the intranet behind the server array controller 118 which can monitor several aspects of the node servers. The controller 118 can load balance each connection to the intranet of node servers by selecting a unique ip address for a node server to provide optimal access to a requested resource.

The selected node server will provide access to the requested resource in an HTTP response that is sent by the server array controller 118 over the Internet 110 to the virtual client ip address at the Local ISP 102. The HTTP response includes a SET COOKIE command in the header of the response which includes information identifying the actual node server on the intranet behind the server array controller 118. The client accesses the requested resource in the HTTP response received from the Local ISP 102.

Figure 1B:
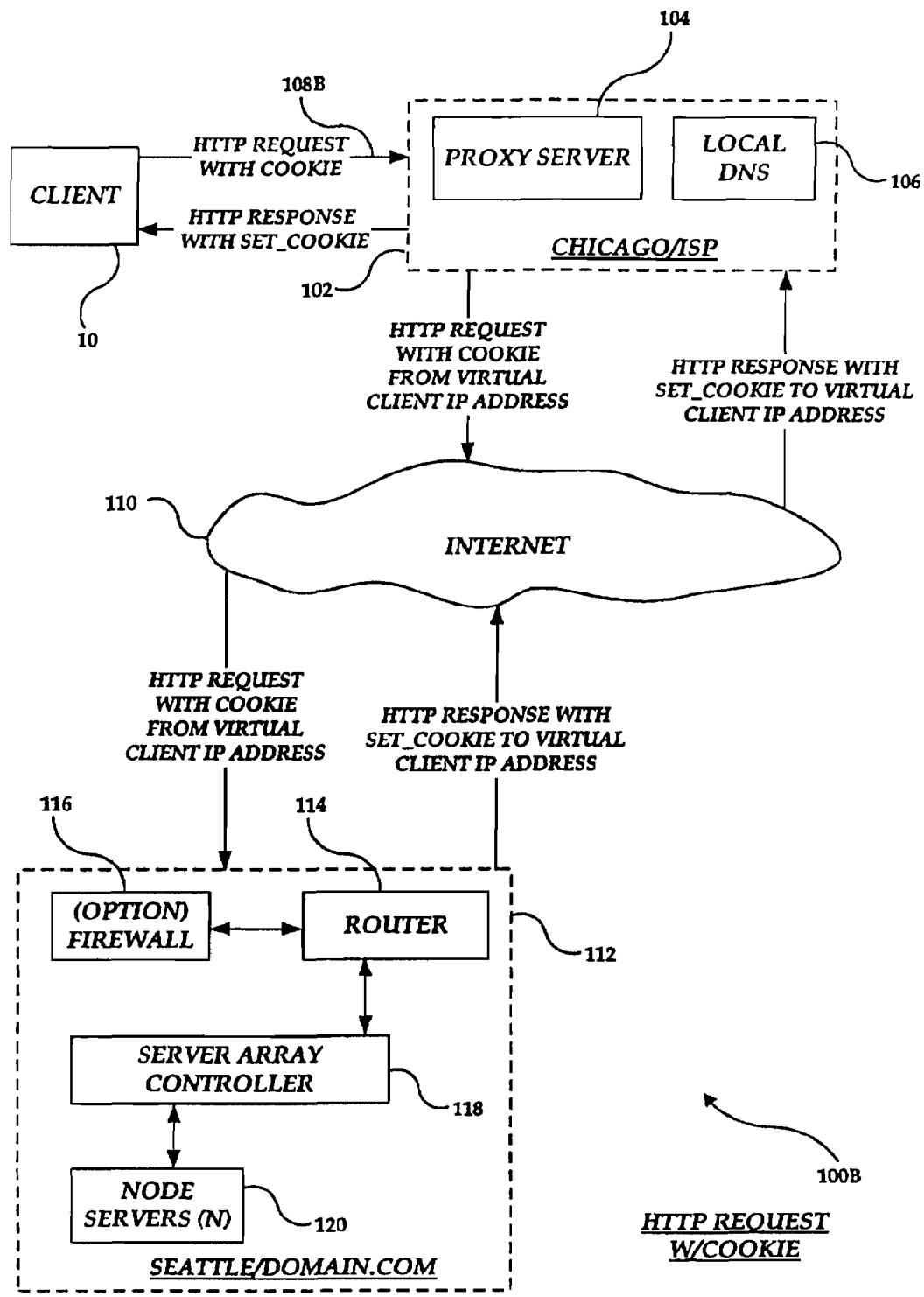
FIG. 1B is a schematic overview of a system for processing an HTTP request that does include a Cookie.

FIG. 1B illustrates a system overview 100B of substantially the same data stream flow as shown in FIG. 1A, except that the client 10 is providing an HTTP request 108B which includes a Cookie uniquely identifying a relationship between the previously selected node server and the client requesting access to the resource. So long as the Cookie is not expired, the server array controller 118 will automatically direct the HTTP request to the destination (node server) identified by the information in the Cookie. Thus, the server array controller 118 can use the information in the Cookie to reliably and efficiently load balance client demands for access to requested resources.

Logic Overview

Figure 2A:
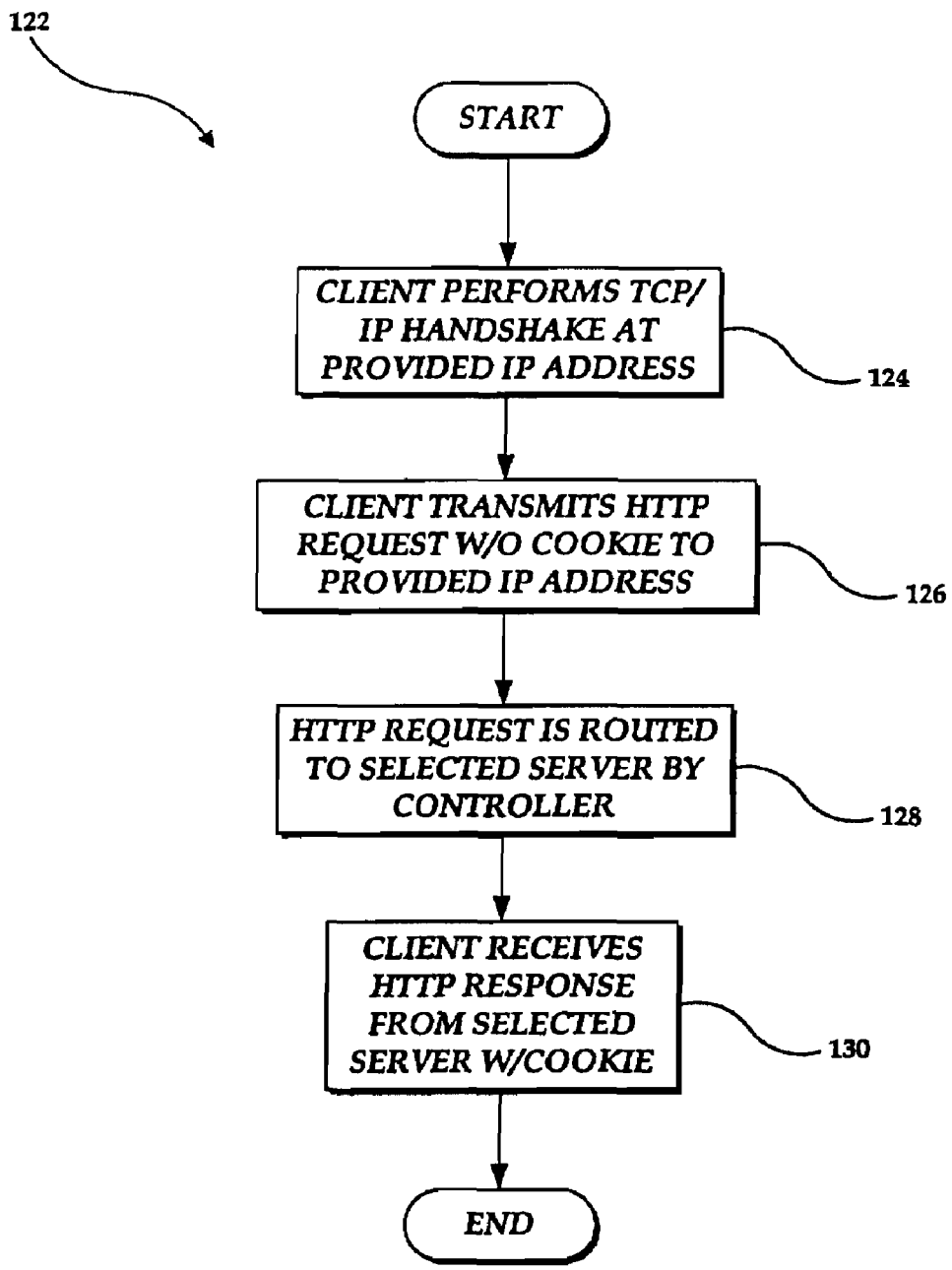
FIG. 2A is a flow chart showing an overview for processing an HTTP request that does not include a Cookie.

In FIG. 2A, an overview 122 is shown of the general logic flow for an HTTP request that does not include a Cookie identifying the actual node server that will provide access to the requested resource. Moving from a start block, the logic steps to a block 124 where a TCP/IP handshake is performed between the client 10 and the server array controller 118 at the ip address provided by the client. Advancing to a block 126, the client 10 transmits the HTTP request to the server array controller 118 without a Cookie identifying the node server that will provide access to the requested resource.

Flowing to a block 128, the server array controller 118 makes a load balancing determination and selects the optimal node server to provide access to the requested resource and routes the HTTP request to the selected node server. The server array controller 118 may employ any one of several different types of load balancing methods to analyze metric information and optimally balance client HTTP requests (load demand). These load balancing methods include round trip time, round robin, least connections, packet completion rate, quality of service, server array controller packet rate, topology, global availability, hops, static ratio and dynamic ratio.

Stepping to a block 130, the selected node server generates an HTTP response that enables the client 10 to access the requested resource. The selected node server transmits the generated HTTP response to the server array controller 118 which retransmits the response to the client 10 along with information included with a SET COOKIE command that enables the particular ip address of the selected node server to be identified. Depending upon the mode of the present invention that is selected, the SET COOKIE command may be inserted in the header of the HTTP response by the server array controller 118 and/or the selected node server. Next, the logic moves to an end block and terminates.

Figure 2B:
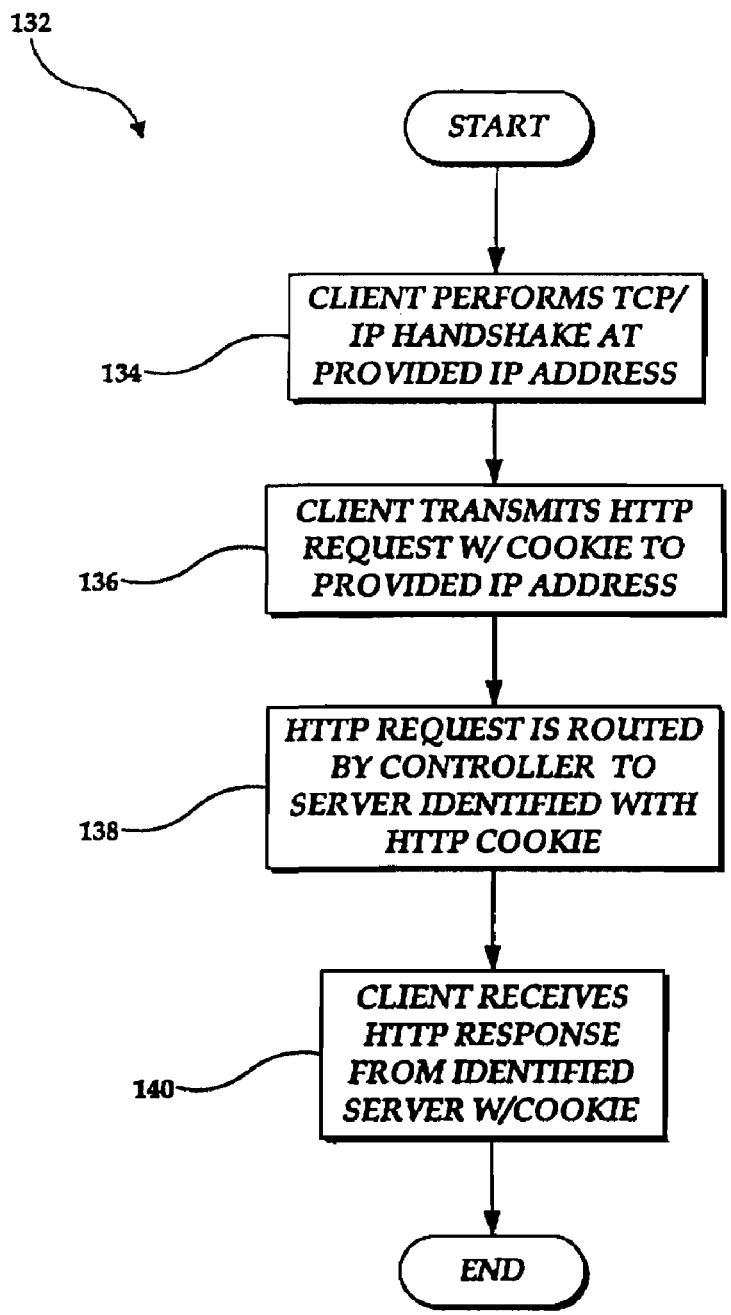
FIG. 2B is a flow chart illustrating an overview for processing an HTTP request that does include a Cookie.

FIG. 2B shows an overview 132 for processing an HTTP request that includes a Cookie with information that can be used to identify the destination that was previously selected to provide access to the requested resources. Moving from a start block, the logic steps to a block 134 where a TCP/IP handshake is performed between the client 10 and the server array controller 118 associated with the node server identified in the Cookie. Advancing to a block 136, the client 10 transmits the HTTP request to the server array controller 118 along with the Cookie and its information. The logic flows to a block 138 where the server array controller 118 uses the information included in the Cookie to route the HTTP request directly to the ip address of the node server that was previously selected to provide access to the requested resources.

Next, the logic moves to a block 140 where the selected node server generates an HTTP response for accessing the requested resources and provides this HTTP response to the server array controller 118. The controller 118 retransmits the HTTP response to the client 10 along with a SET COOKIE command that includes information that can be used to identify a relationship between the client and the destination (node server) that will provide access to the requested resources. The logic moves to an end block and terminates. The present invention thus enables the server array controller 118 to use the information in the Cookie to quickly, reliably and efficiently load balance client demands for access to requested resources.

Although not shown, another embodiment of the present invention enables the server array controller 118 to vary the expiration date of the time stamp included with HTTP requests and responses. When the load demand on the server array controller 118 increases, the controller may increase the period of time (expiration date) before the time stamp expires. Alternatively, when the load on the server array controller 118 decreases, the controller may decrease the period of time before the time stamp expires. By varying the expiration dates of the time stamps, the server array controller 118 may control the number of times that the controller performs load balancing determinations within a period of time. Also, when only a few destinations can provide access to the requested resource, the server array controller 118 may set the time stamp expiration date to one year or more.

The present invention provides at least four different modes of operation for inserting information in an HTTP response and examining Cookies in an HTTP request for uniquely identifying a relationship between the client and a selected destination such as a node server to provide access to the requested resources. These modes of operation include associative, passive, rewrite and insert.

Associative Mode

Figure 3A:
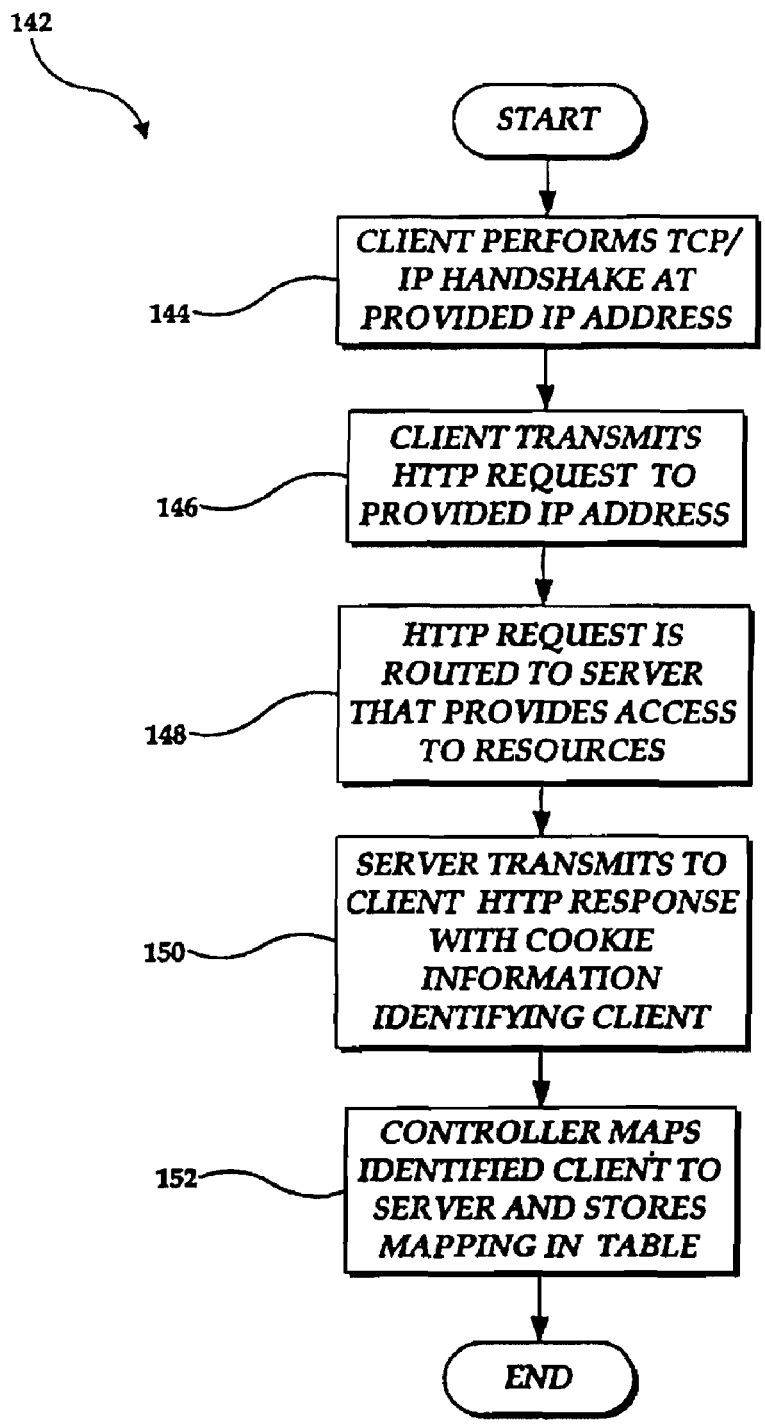
FIG. 3A is a flow chart showing an associative mode for processing an HTTP request that does not include a Cookie.

In FIG. 3A, an overview 142 of an "associative" mode for processing an HTTP response without a Cookie is illustrated. Moving from a start block, the logic steps to a block 144 where a TCP/IP handshake is performed between the client 10 and the server array controller 118 at the ip address provided by the client. Advancing to a block 146, the client 10 transmits the HTTP request to the server array controller 118.

The logic flows to a block 148 where the server array controller 118 receives the HTTP request and makes a load balancing determination to select the optimal node server to provide access to the requested resource. After selecting the optimal node server, the server array controller 118 routes the HTTP request to the selected node server.

The logic steps to a block 150 where the selected node server generates an HTTP response that provides access to the requested resource. The selected node server transmits the HTTP response to the server array controller 118. The server array controller 118 inserts a SET COOKIE command with information uniquely identifying the client 10 into the HTTP response's header. The controller 118 retransmits the HTTP response and the Cookie information to the client 10.

Alternatively, the selected node server may include the SET COOKIE command in the HTTP response's header with blank information. In this case, the server array controller 118 rewrites this blank information with information that uniquely identifies the client 10 and retransmits the "rewritten" HTTP response to the client.

Next, the logic flows to a block 152 where the server array controller 118 maps the identified client and the ip address of the selected node server into a table that is stored in the memory of the controller. The logic moves to an end block and terminates. Additionally, it is understood that the SET COOKIE command causes the client to store the Cookie information that uniquely identifies the client, so that when the same HTTP request is repeated by the client, this stored Cookie information will be used to create a Cookie that is included with the repeated HTTP request.

Figure 3B:
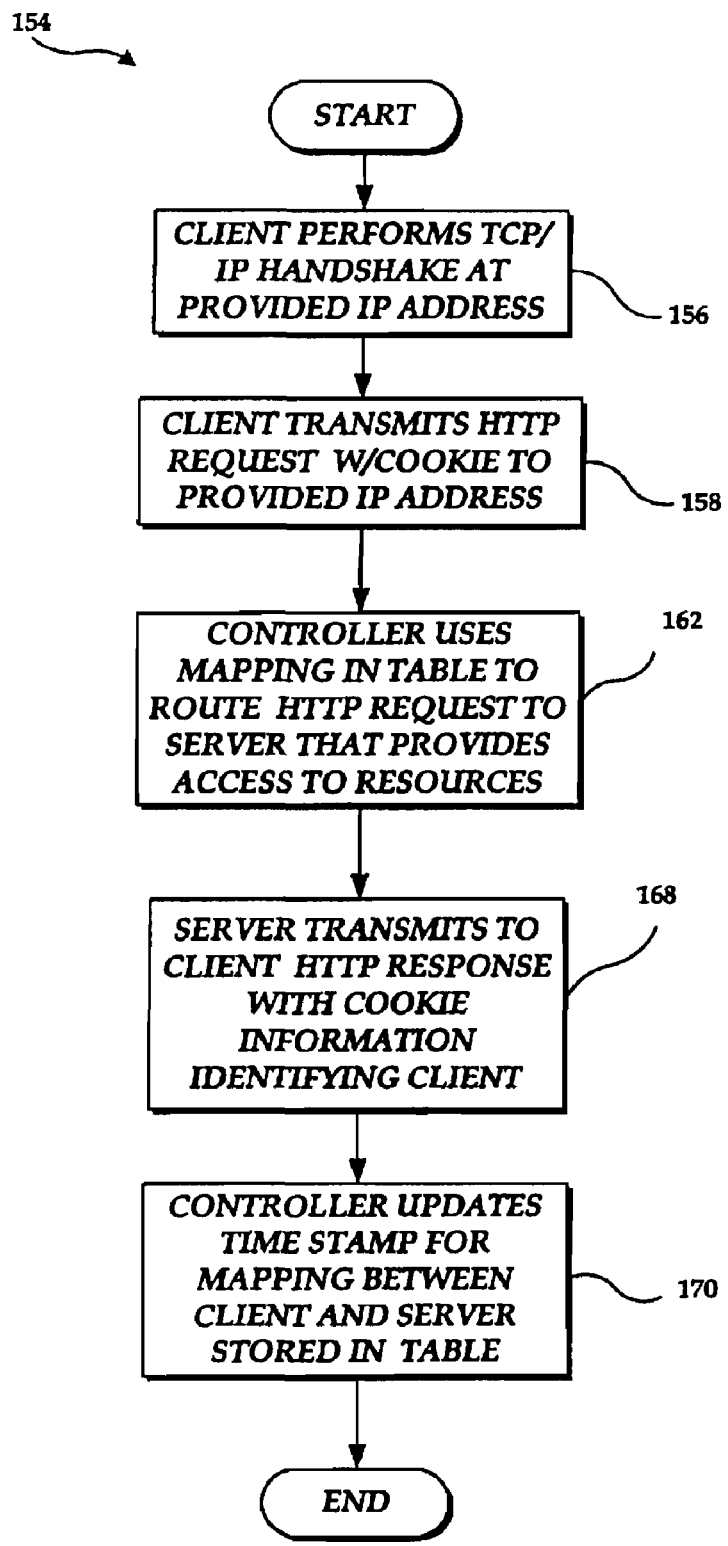
FIG. 3B is a flow chart illustrating an associative mode for processing an HTTP request that does include a Cookie.

FIG. 3B shows an overview 154 of an "associative" mode for processing an HTTP request that includes a Cookie with information that can be used to identify the client 10. The Cookie for an HTTP request may be provided from a previous HTTP request/response exchange as illustrated in FIG. 3A above. It is also envisioned that another facility may be employed to create a Cookie for the HTTP request that includes information identifying the client 10. In this example, the information included in the Cookie enables the server array controller 118 to uniquely identify the client 10 and a mapped relationship to a previously selected node server. Moving from a start block, the logic steps to a block 156 where a TCP/IP handshake is performed between the client 10 and the server array controller 118 at an ip address provided by the client. Advancing to a block 158, the HTTP request along with the Cookie is transmitted from the client 10 to the server array controller 118.

The logic will move to a block 162 where the server array controller 118 will access the table held in its memory and identify the mapped relationship between the client and the previously selected node server for accessing the requested resources. Using the mapped relationship in the table, the controller 118 will provide the HTTP request to the previously selected node server. The logic flows to a block 168 where the node server generates an HTTP response which includes a SET COOKIE command with information that can be used to uniquely identify the client 10 requesting access to the resources at the ip address of the selected node server. The logic moves to a block 170 where the server array controller 118 updates another time stamp stored in the table which is associated with the mapping of the relationship between the client and the selected node server. Next, the logic moves to an end block and terminates.

Alternatively, in another embodiment, the node server could include a SET COOKIE command with blank information in the generated HTTP response. In this case, the server array controller 118 would rewrite the blank information to include other information that uniquely identifies the client 10 requesting access to the resources at the ip address of the selected node server.

In summary, the associative mode provides for inserting a Cookie into an HTTP response that uniquely identifies the client so that when a client's subsequent HTTP request is compared to a table, this subsequent HTTP request will be provided to a previously selected destination. The present invention thus enables the server array controller 118 to use the information in the Cookie to load balance client demands for access to requested resources. Additionally, it is understood that the associative mode puts most of the load for processing an HTTP request on the server array controller 118 relative to the load placed on a previously selected node server that is managed by the controller.

Passive Mode

Figure 4A:
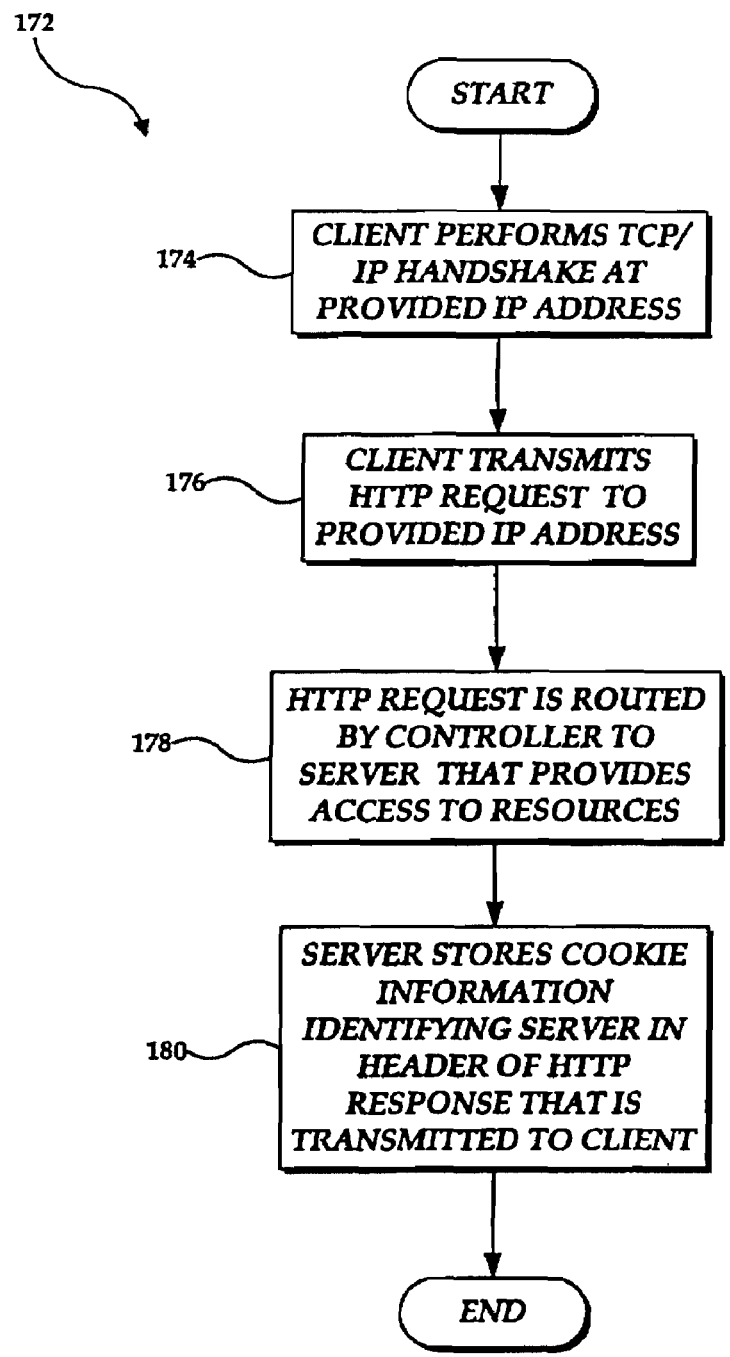
FIG. 4A is a flow chart showing a passive mode for processing an HTTP request that does not include a Cookie.

In FIG. 4A, an overview 172 of a "passive" mode for processing an HTTP request/response is illustrated. Moving from a start block, the logic steps to a block 174 where a TCP/IP handshake is performed between the client 10 and the server array controller 118 at the ip address provided by the client. Advancing to a block 176, the client 10 transmits the HTTP request to the server array controller 118.

The logic flows to a block 178 where the server array controller 118 receives the HTTP request and makes a load balancing determination to select the optimal node server to provide access to the requested resource. After selecting the optimal node server, the server array controller 118 provides the HTTP request to the selected node server. The logic steps to a block 180 where the selected node server generates an HTTP response that includes Cookie information identifying the selected node server, i.e., a SET COOKIE command is inserted into the header of the HTTP response. The selected node server provides the HTTP response along with the inserted Cookie information to the server array controller 118. The server array controller 118 provides the HTTP response with the Cookie information to the client 10. Next, the logic moves to an end block and terminates. Additionally, it is understood that the SET COOKIE command causes the client to store Cookie information that identifies the previously selected destination, e.g., a node server, so that when the same HTTP request is repeated by the client, this stored Cookie information will be used to create a Cookie that is included with the repeated HTTP request.

FIG. 4B shows an overview 182 of a "passive" mode for processing an HTTP request that includes a Cookie with information identifying a previously selected node server for providing access to requested resources. Moving from a start block, the logic steps to a block 184 where a TCP/IP handshake is performed between the client 10 and the server array controller 118 at the ip address provided by the client. Advancing to a block 186, the HTTP request along with the Cookie is transmitted from the client 10 to the server array controller 118.

The logic moves to a block 190 where the server array controller 118 will use the information included in the Cookie to provide the HTTP request to the previously selected node server. The logic steps to a block 194 where the selected node server generates an HTTP response including Cookie information that identifies the selected node server. The selected node server provides the HTTP response with the Cookie information to the server array controller 118. The server array controller 118 retransmits the HTTP response with the Cookie information to the client 10. Next, the logic moves to an end block and terminates.

In summary, the passive mode provides for inserting Cookie information into an HTTP response that uniquely identifies a previously selected destination, such as a node server, so that when a client's subsequent HTTP request is examined, it can be efficiently provided to the previously selected destination. The present invention thus enables the server array controller 118 to use the information in the Cookie to load balance client demands for access to requested resources. Also, the passive mode puts most of the load for processing an HTTP request on a node server relative to the load placed on a server array controller 118 managing the node server.

Rewrite Mode

Figure 5A:
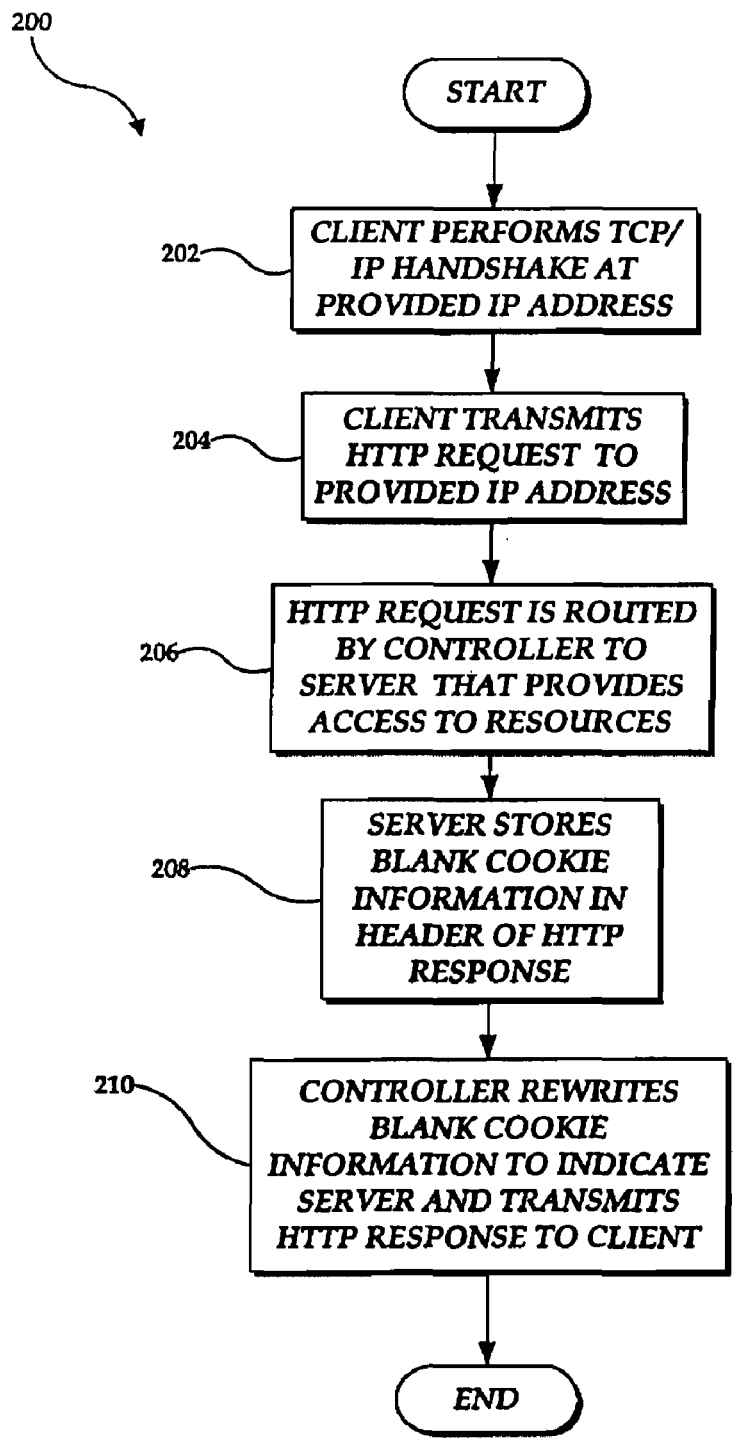
FIG. 5A is a flow chart showing a rewrite mode for processing an HTTP request that does not include a Cookie.

In FIG. 5A, an overview 200 of a "rewrite" mode for processing an HTTP response is illustrated. Moving from a start block, the logic steps to a block 202 where a TCP/IP handshake is performed between the client 10 and the server array controller 118 at the ip address provided by the client. Advancing to a block 204, the client 10 transmits the HTTP request to the server array controller 118.

The logic flows to a block 206 where the server array controller 118 receives the HTTP request and makes a load balancing determination to select the optimal node server to provide access to the requested resource. After selecting the optimal node server, the server array controller 118 routes the HTTP request to the selected node server. The logic steps to a block 208 where the selected node server generates an HTTP response that includes blank Cookie information, i.e., a SET COOKIE command is inserted into the header of the HTTP response without information identifying the selected node server. The selected node server provides the HTTP response with the blank Cookie information to the server array controller 118. The logic moves to a block 210 where the controller 118 rewrites the blank Cookie information to identify the node server selected to provide access to the requested resources. The server array controller 118 transmits the HTTP response and the rewritten Cookie information to the client 10. Next, the logic moves to an end block and terminates.

Figure 5B:
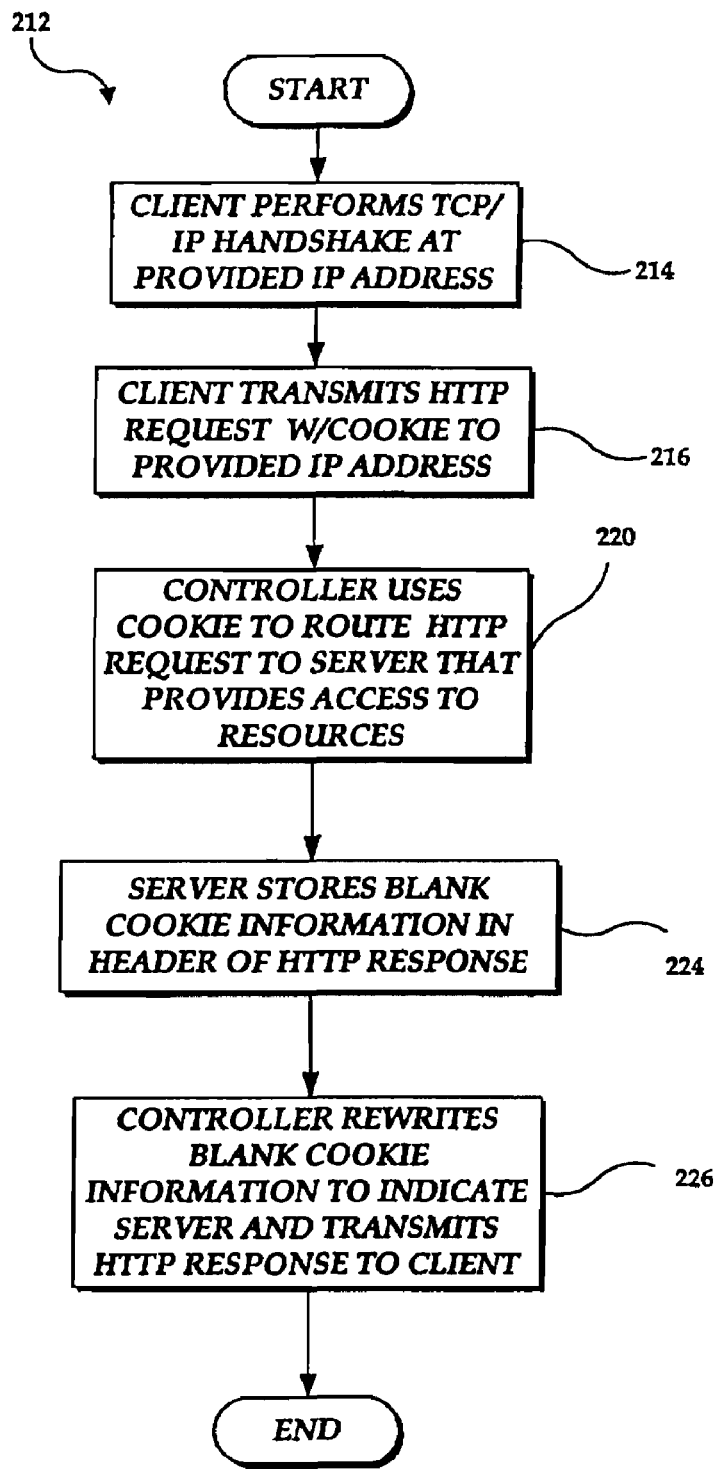
FIG. 5B is a flow chart illustrating a rewrite mode for processing an HTTP request that does include a Cookie.

FIG. 5B shows an overview 212 of a "rewrite" mode for processing an HTTP request that includes a Cookie with information for identifying a node server previously selected to provide access to the requested resources. Moving from a start block, the logic steps to a block 214 where a TCP/IP handshake is performed between the client 10 and the server array controller 118 at an ip address provided by the client. Advancing to a block 216, the HTTP request along with the Cookie is transmitted from the client 10 to the server array controller 118.

The logic will move to a block 220 where the server array controller 118 will use the information included in the Cookie to identify the previously selected node server and route the HTTP request to this node server. The logic steps to a block 224 where the selected node server generates an HTTP response that includes blank Cookie information. The selected node server provides the HTTP response along with the inserted blank Cookie information to the server array controller 118. The logic steps to a block 226 where the server array controller 118 rewrites the blank Cookie information to include other information that identifies the selected node server. Next, the logic moves to an end block and terminates.

In the rewrite mode, the server array controller 118 manages the other "destination" information that is rewritten over the blank Cookie information. The rewrite mode roughly divides the load for processing an HTTP request/response between a server array controller 118 and a selected node server that is managed by the controller. The rewrite mode places a portion of this load on the selected node server to insert the blank Cookie in an HTTP response and another portion of this load on a server array controller 118 for rewriting the blank Cookie information to include other information that identifies the selected destination (node server). One advantage of the rewrite mode is that a plurality of node servers managed by the server array controller 118 may have the same content related to inserting blank Cookie information into an HTTP response. In this way, updates to the plurality of node servers are more easily provided because each node server can have the same content. Also, since the other information identifying the destination will occupy the same space as the blank Cookie information that was written over, the actual data packet containing the HTTP response does not have to change in size.

Insert Mode

Figure 6A:
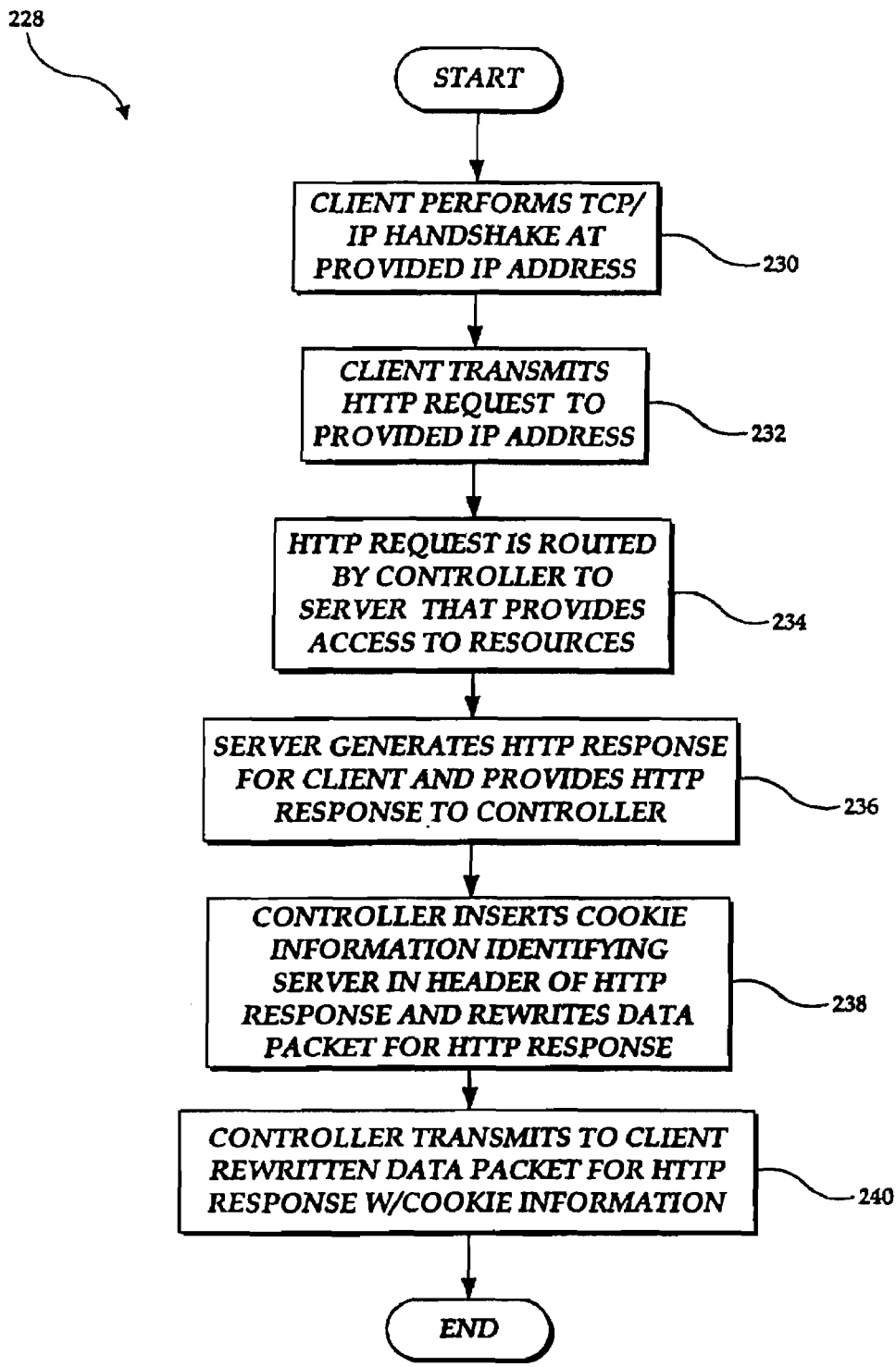
FIG. 6A is a flow chart showing an insert mode for processing an HTTP request that does not include a Cookie.

In FIG. 6A, an overview 228 of an "insert" mode for processing an HTTP request/response is illustrated. Moving from a start block, the logic steps to a block 230 where a TCP/IP handshake is performed between the client 10 and the server array controller 118 at the ip address provided by the client. Advancing to a block 232, the client 10 transmits the HTTP request to the server array controller 118 at the primary ip address.

The logic flows to a block 234 where the server array controller 118 receives the HTTP request and makes a load balancing determination to select the optimal node server to provide access to the requested resource. The server array controller 118 provides the HTTP request to the selected node server. The logic steps to a block 236 where the selected node server generates an HTTP response and provides the generated HTTP response to the server array controller 118. The logic moves to a block 238 where the server array controller 118 rewrites the data packet(s) containing the HTTP response so that Cookie information identifying the node server selected to provide access to the requested resources can be inserted into the data packet. The logic flows to a block 240 where the server array controller 118 provides to the client 10 the rewritten data packet that includes the HTTP response and the inserted Cookie information. Next, the logic moves to an end block and terminates.

Figure 6B:
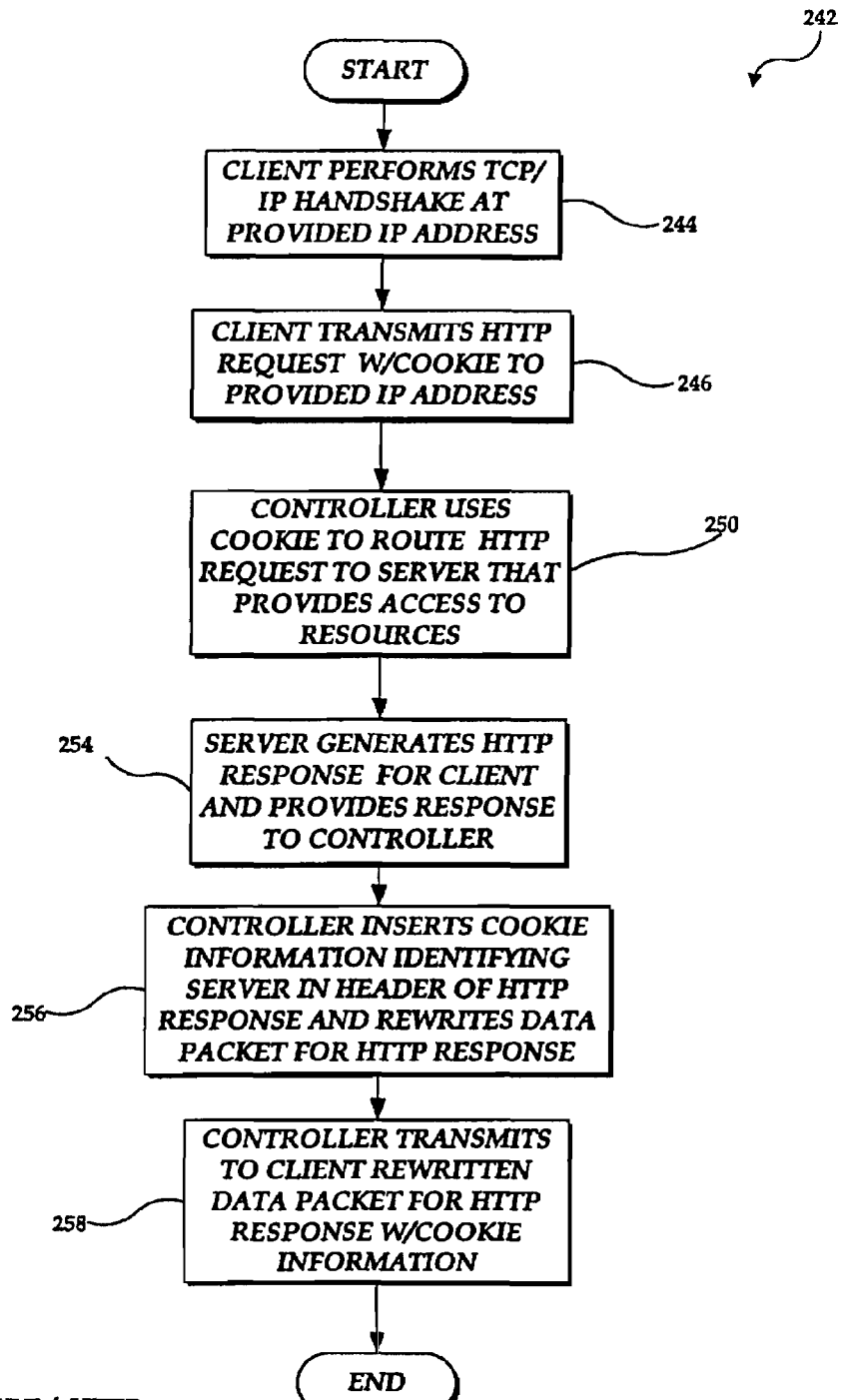
FIG. 6B is a flow chart illustrating an insert mode for processing an HTTP request that does include a Cookie.

FIG. 6B shows an overview 242 of an "insert" mode for processing an HTTP request that includes a Cookie with information identifying a node server previously selected to provide access to the requested resources. Moving from a start block, the logic steps to a block 244 where a TCP/IP handshake is performed between the client 10 and the server array controller 118 at an ip address provided by the client. Advancing to a block 246, the HTTP request along with the Cookie is transmitted from the client 10 to the server array controller 118.

The logic will move to a block 250 where the server array controller 118 will use the information included in the Cookie to identify the previously selected node server. The server array controller 118 will rewrite the data packet(s) containing the HTTP response. The server array controller 118 will provide the rewritten data packet(s) containing the HTTP response to the client 10. The logic steps to a block 254 where the selected node server generates an HTTP response and provides the HTTP response to the server array controller 118. The logic moves to a block 256 where the server array controller 118 rewrites the data packet(s) containing the HTTP response to insert Cookie information into the response's header for identifying the node server selected to provide access to the requested resources. The logic flows to a block 258 where the server array controller 118 transmits to the client 10 a rewritten data packet that includes the HTTP response and the newly inserted Cookie information. Next, the logic moves to an end block and terminates.

The insert mode enables a server array controller 118 to load balance client demands for access to requested resources by inserting and removing Cookie information in the data packets for HTTP requests and responses prior to processing by the destination (selected node server). In the insert mode, all of the load for inserting and examining Cookie information and rewriting data packets is placed on the server array controller 118 and none of this load is put on the node servers managed by the controller.

Exemplary Cookie Code Fragments

In FIGS. 7A-7E, exemplary embodiments of HTML code fragments are shown that illustrate Cookie information included with an HTTP request/response. FIG. 7A shows an exemplary code fragment for an HTTP request 260 that includes Cookie information identifying a server that previously provided access to the requested resources. FIG. 7B illustrates an exemplary code fragment for an HTTP request 262 that contains blank Cookie information that does not identify the client 10 or a previously selected destination such as a node server. FIG. 7C shows an exemplary code fragment for an HTTP request 264 that includes Cookie information identifying the client 10 that previously requested access to the requested resources. FIG. 7D illustrates an exemplary code fragment for an HTTP response 266 that includes Cookie information identifying a server that previously provided access to the requested resources. FIG. 7E shows an exemplary code fragment for an HTTP response 267 that includes Cookie information identifying the client requesting access to the resources provided by the server.

Proxy Server Buffering

FIG. 8 illustrates an overview of how certain data packets between the client and a selected node server 274 are buffered and replayed by a server array controller's proxy server 270. A rectangular graphical representation of the proxy server 270 is vertically disposed along the center portion of this figure. Also, positioned along the center line of the developed length of the proxy server 270 is a time line 271 that starts with an initial value of "zero" near the top of the graphical representation of the proxy server. On the left side of the proxy server 270 is a graphical representation of a client 272 transmitting and receiving data packets along the developed length (and time line 271) of the proxy server. Similarly on the right side of the proxy server 270 is a graphical representation of a node server 274 transmitting and receiving data packets along the developed length of the proxy server.

Starting at the top left side of the figure, the client 10 is transmitting and receiving three separate groups of data packets with the proxy server 270. First, a TCP SYN 276A data packet is transmitted from the client 272 to the proxy server 270, which is followed by an exchange of TCP SYN/ACK..ACK 278A data packets. Next, an HTTP REQUEST 280A data packet is transmitted to the proxy server by the client.

All three groups of data packets are buffered and stored by the proxy server 270 until the HTTP REQUEST 280A is received by the proxy server. Then, the server array controller will examine the data packet(s) associated with the HTTP REQUEST 280A to determine if it includes Cookie information that identifies the client and/or a destination that previously provided access to the requested resources.

Once the Cookie determination is made, the proxy server 270 will sequentially replay the transmitting and receiving of the three groups of data packets with the selected node server 274. On the right side of the graphical representation of the proxy server 270, these three groups of data packets are replayed between the proxy server 270 and the node server 274. First, a TCP SYN 276B data packet is transmitted from the proxy server 270 to the node server 274, followed by an exchange of TCP SYN/ACK.ACK 278B data packets and next an HTTP REQUEST 280B data packet is transmitted to the node server 274 by the proxy server 270.

Moving further down the length of the graphical representation of the proxy server 270, a data packet(s) for an HTTP RESPONSE 282A is provided to the proxy server 270 by the selected node server 274. The proxy server 270 immediately replays this data packet to the client 272 in HTTP RESPONSE 282B. Next, the client 272 exchanges TCP FIN.ACK.FIN.ACK 2848 data packets with the proxy server 270. The proxy server 270 immediately replays these data packets to the node server 274 as TCP FIN.ACK.FIN.ACK 284A data packets.

It is important to note that the present invention only employs the proxy server 270 to buffer and store data packets until the HTTP request is received. Once the HTTP request is received, the proxy server will replay all of the buffered data packets for the selected node server 274 and switch to a forwarding mode for subsequent data packets, i.e., the proxy server will immediately replay all subsequent data packets transmitted by the client 272 to the selected node server.

System Configuration

Figure 9:
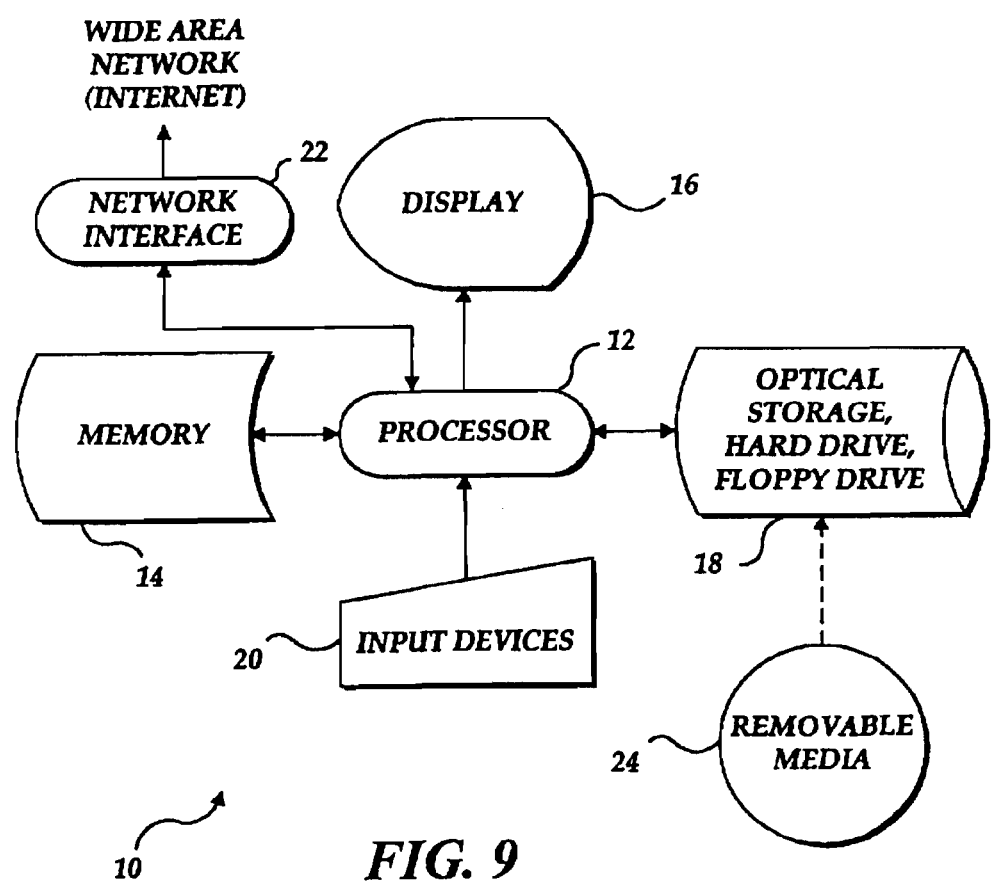
FIG. 9 illustrates an exemplary computer system for the client.

FIG. 9 illustrates a system for the client 10 comprising components of a computer suitable for executing an application program embodying the present invention. In FIG. 5, a processor 12 is coupled bi-directionally to a memory 14 that encompasses read only memory (ROM) and random access memory (RAM). ROM is typically used for storing processor specific machine code necessary to bootup the computer comprising client 10, to enable input and output functions, and to carry out other basic aspects of its operation. Prior to running any application program, the machine language code comprising the program is loaded into RAM within memory 14 and then executed by processor 12. Processor 12 is coupled to a display 16 on which the visualization of the HTML response discussed above is presented to a user. Often, programs and data are retained in a nonvolatile memory media that may be accessed by a compact disk-read only memory (CD-ROM) drive, compact disk-read/write memory (CD-R/W) drive, optical drive, digital versatile disc (DVD) drive, hard drive, tape drive and floppy disk drive, all generally indicated by reference numeral 18 in FIG. 9. A network interface 22 couples the processor 12 to a wide area network such as the Internet.

As noted above, the present invention can be distributed for use on the computer system for the client 10 as machine instructions stored on a memory media such as a floppy disk 24 that is read by the floppy disk drive. The program would then typically be stored on the hard drive so that when the user elects to execute the application program to carry out the present invention, the machine instructions can readily be loaded into memory 14. Control of the computer and selection of options and input of data are implemented using input devices 20, which typically comprise a keyboard and a pointing device such as a mouse (neither separately shown). Further details of system for the client 10 and of the computer comprising it are not illustrated, since they are generally well known to those of ordinary skill in the art. Additionally, although not shown, computer systems for the node server 120 and the server array controller 118 could be configured in substantially the same way as the computer system for the client 10 illustrated here, albeit different in other ways.

Cookie Types

It is further envisioned that other types of Cookies may be used to identify a path that would be used to exchange data packets between the client and a destination such as a host machine, firewall, router or a node server managed by a server array controller. A "path" type of Cookie could be used to indicate the actual route and interim destinations that the data packets must use to travel between the client (source side) and the destination (supply side). For example, the path Cookie could indicate the individual routers that must be used to send data packets containing the HTTP requests and/or HTTP responses between the client and the destination.

A "hops" type of Cookie could be used to indicate an intermediate destination in the route the data packets must use to travel between the client and the destination. For example, a hops cookie could indicate a particular router that must always be used to send data packets containing the HTTP requests and/or HTTP responses between the client and the destination.

A "priority" type of Cookie may be used to indicate a priority for processing a data packet containing an HTTP request ahead of other data packets. Also, each priority Cookie could include a range of values indicating a level of priority. In this way, a data packet containing an HTTP request and a priority Cookie with the high priority value would be processed (sent) ahead of other data packets that contained HTTP requests and lower priority Cookies.

A "load balancing" Cookie could be used to indicate the load balancing method that the server array controller should perform to select the optimal node server to provide access to the resources when an HTTP request does not include a current Cookie with information identifying a destination. It is also envisioned that multiple types of Cookies and information could be included in HTTP requests and HTTP responses.

Additionally, it is envisioned that a unique identification of a client or a destination may be represented as encoded information in the Cookie. The result of an equation or a hash value may be used to encode the destination uniquely identified in the Cookie. A hash value (or simply hash) is a number generated from a string of text. The hash is substantially smaller than the text itself, and it is generated by a formula in such a way that it is extremely unlikely that some other text will produce the same hash value. Generally, the sender generates a hash of a message, encrypts the hash, and sends it with the message itself. The recipient then decrypts both the message and the hash, produces another hash from the received message, and compares the two hashes. If they are the same, there is a very high probability that the message was transmitted intact. A hash provides a quickly determinable value in the Cookie for identifying a relationship between the client and the destination.

An exemplary equation for directly determining the ip address of a selected node server (N) is as follows:

$$ip4 = N \%256;$$

$$ip3 = ((N-ip4)/256)\%256;$$

$$ip2 = ((N-ip4-ip3*256)/(256*256)\%256;$$

$$ip1 = ((N-ip4-ip3*256-ip2*256*256)/(256*256*256))\%256;$$

Where the ip address for N=ip1*256*256*256+ip2*256*256+ip3*256+ip4.

While the preferred embodiment of the invention has been illustrated and described, it will be appreciated that various changes can be made therein without departing from the spirit and scope of the invention.

What is claimed is:

1. A method of enabling a load balancing system, comprising:
    enabling a load balancer to load balance incoming client requests to a plurality of servers;
    enabling each server of the plurality of servers to include blank persistence information as at least part of an application level protocol command in a response to a client request;
    enabling the load balancer to receive the response to the client request from each of the plurality of servers, and to write persistence information that identifies the respective server in place of the blank persistence information; and
    enabling the load balancer to recognize persistence information that is at least part of application level protocol commands included with incoming client requests, and to forward at least some incoming client requests having persistence information to one of the plurality of servers based at least in part on the persistence information included with the incoming client requests.

2. The method of claim 1, wherein the persistence information is included in an HTTP cookie command.

3. A device in a network that includes a plurality of clients and a plurality of servers, comprising:
    a mechanism that receives a Hypertext Transport Protocol (HTTP) request from a client; and
    a processor for enabling actions, including:
    determining a destination server from the plurality of servers, based at least in part on a load balancing determination;
    determining if the client previously communicated with the destination server, based at least in part on persistence information included in at least part of an application level protocol command, wherein the application level protocol command includes at least part of an HTTP cookie;
    if it is determined that the client previously communicated with the destination server, determining the destination server based at least in part on the persistence information in the HTTP cookie; and
    forwarding the HTTP request to the destination server.

4. The device of claim 3, further comprising commanding the client to create the HTTP cookie to include information identifying the destination server.

5. The device of claim 3, further comprising receiving the HTTP cookie from the destination server and inserting the persistence information in the HTTP cookie.

6. The device of claim 3, further comprising receiving the HTTP cookie form the destination server and rewriting at least a portion of the HTTP cookie to include the persistence information.

7. The device of claim 3, wherein the device is operational as at least one of a router, a load balancer, a switch, a server array controller, a server, and an intermediate network device.

8. The device of claim 3, wherein the HTTP cookie includes a key.

9. A system for load balancing communication in a network, comprising:
- a plurality of clients;
- a plurality of servers; and
- a device that includes:
- a mechanism arranged to receive a Hypertext Transport Protocol (HTTP) request from a client; and
- a processor for enabling actions, including:
- determining a destination server from the plurality of servers, based at least in part on a load balancing determination;
- determining if the client previously communicated with the destination server, based at least in part on persistence information included in at least part of an application level protocol command, wherein the application level protocol command includes at least part of an HTTP cookie;
- if it is determined that the client previously communicated with the destination server, determining the destination server based at least in part on the persistence information in the HTTP cookie; and
- forwarding the HTTP request to the destination server.

10. The system of claim 9, further comprising commanding the client to create the HTTP cookie to include information identifying the destination server.

11. The system of claim 9, further comprising receiving the HTTP cookie from the destination server and inserting the persistence information in the HTTP cookie.

12. The system of claim 9, further comprising receiving the HTTP cookie form the destination server and rewriting at least a portion of the HTTP cookie to include the persistence information.

13. The system of claim 9, wherein the device is operational as at least one of a router, a load balancer, a switch, a server array controller, a server, and an intermediate network device.

14. The system of claim 9, wherein the HTTP cookie includes a key.

* * * * *